(12) United States Patent
Shima et al.

(10) Patent No.: US 7,369,259 B2
(45) Date of Patent: May 6, 2008

(54) PRINTER AND PRINT SYSTEM, AND DATA RECEIVING DEVICE AND DATA TRANSMITTING AND RECEIVING SYSTEM

(75) Inventors: Toshihiro Shima, Nagano-Ken (JP); Kazuhito Gassho, Nagano-Ken (JP); Teruhito Kojima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 1043 days.

(21) Appl. No.: 10/465,036

(22) Filed: Jun. 18, 2003

(65) Prior Publication Data

US 2004/0075861 A1  Apr. 22, 2004

(30) Foreign Application Priority Data

Jun. 21, 2002  (JP)  ............................. 2002-181699

(51) Int. Cl.
G06F 3/12 (2006.01)
H04N 1/00 (2006.01)
(52) U.S. Cl. .................. 358/1.15; 358/1.5; 340/539.13
(58) Field of Classification Search ............... 358/1.15; 702/150; 713/171; 709/203; 235/380; 340/539.13
See application file for complete search history.

(56) References Cited

U.S. PATENT DOCUMENTS

| 6,772,945 | B2 * | 8/2004 | Mahoney et al. | ........... 235/380 |
| 2002/0161547 | A1 * | 10/2002 | Fidler | .......... 702/150 |
| 2003/0105963 | A1 * | 6/2003 | Slick et al. | .............. 713/171 |
| 2003/0169443 | A1 * | 9/2003 | Ando | ........................ 358/1.14 |

* cited by examiner

Primary Examiner—King Y. Poon
Assistant Examiner—Lennin R Rodriguez
(74) Attorney, Agent, or Firm—Martine Penilla & Gencarella, LLP

(57) ABSTRACT

A printer stores printer position information in sequence and calculates its representative value as statistical printer position information by a statistical method. When a public key is requested by a print client, the printer generates a public key with a passphrase containing the statistical printer position information and transmits the public key to the print client. The print client generates print transmitting data by encrypting print data with this public key and transmits the print transmitting data to the printer. The printer generates a private key with a passphrase containing the statistical printer position information at this point in time and decrypts the print data.

10 Claims, 18 Drawing Sheets

TB20: PUBLIC KEY TABLE

| PRINTER | PUBLIC KEY |
|---|---|
| 192.168.1.10 | PKEY1 |
| 192.168.1.11 | PKEY2 |
| ⋮ | ⋮ |

PRINTER AND PRINT SYSTEM, AND DATA RECEIVING DEVICE AND DATA TRANSMITTING AND RECEIVING SYSTEM

BACKGROUND OF THE INVENTION

1. Field of the Invention

The present invention relates to a printer and a print system, and a data receiving device and a data transmitting and receiving system, and particularly relates to a printer and a print system, and a data receiving device and a data transmitting and receiving system which ensure security of data transmitted to the printer and the data receiving device.

2. Description of the Related Art

These days, a print system in which a printer is shared by means of a network has been increasingly used. Namely, by connecting plural computers as print clients to one network and connecting, for example, one printer to this network, one printer can accept print data from the plural print clients and print the print data.

In such a print system by means of the network, various users can transmit print data from their respective print clients to the printer and perform printing.

However, if the print data transmitted from the print clients is printed by the printer unconditionally, a print operation is executed even by the printer which is not installed in a place where the user intends to perform printing. In particular, in the case of a printer moved from one place where the printer has been heretofore used to another place, an IP address or the like which is an address on the network sometimes remains unchanged, and hence the transmitted print data may be printed by the printer moved to another place. The above situation is undesirable for users who want to ensure the security of print data.

Moreover, if the print data transmitted from the print clients is printed by the printer unconditionally, even print data transmitted from the print clients which are not duly authorized to perform printing with the printer is printed by the printer. In this case, print clients capable of perform printing with the printer cannot be restricted, which is undesirable as well. Especially when the possibility of the existence of users who transmit a large amount of print data with dishonest intention is considered, it is necessary to provide some print restriction.

Further, in some cases, a printer which has been used in one department of a company is moved to another department and used there. In such a case, even print clients which have heretofore had the authority of perform printing with this printer are not sometimes wanted to be given the authority to perform printing with this printer after the printer has been moved. In the above situation, a need for technology which prevents print data from the print clients from being printed on the printer side is acknowledged.

Hence, the present invention is made in view of the aforementioned problem, and an object of the present invention is to provide a print system which ensures security of print data and a printer by restricting printable print data based on information on a position where the printer is installed. Another object of the present invention is to provide a data transmitting and receiving system which ensures security of transmit data and a data receiving device by restricting processable data based on information on a position where the data receiving device is installed. Still another object of the present invention is to provide a print system capable of smoothly decrypting received print data or a data transmitting and receiving system capable of smoothly decrypting received data even if a measure of variations in position information detected by a printer and a data receiving device occur.

SUMMARY OF THE INVENTION

In order to accomplish the aforementioned and other objects, according to one aspect of the present invention, a printer which processes print transmitting data, comprises:

a print transmitting data receiver which receives the print transmitting data;

a printer position information detector which detects printer position information to specify a place where the printer is installed;

a first printer position information acquisition which acquires printer position information from the printer position information detector at a point in time when the print transmitting data receiver receives the print transmitting data;

a compensation printer position information generator which generates compensation position information based on the printer position information in order to compensate for variations in the printer position information acquired by the first printer position information acquisition; and a print executor which generates a private key with a passphrase containing at least the compensation printer position information, executes a print operation based on the print transmitting data when the print transmitting data is decrypted with the private key, and does not execute the print operation based on the print transmitting data when the print transmitting data is not decrypted with the private key.

According to another aspect of the present invention, a control method of a printer which processes print transmitting data, comprises the steps of:

receiving the print transmitting data;

acquiring printer position information to specify a place where the printer is installed from a printer position information detector at a point in time when the print transmitting data is received and regarding the printer position information as first printer position information;

generating compensation printer position information based on the first printer position information in order to compensate for variations in the first printer position information;

generating a private key with a passphrase containing at least the compensation printer position information; and executing a print operation based on the print transmitting data when the print transmitting data is decrypted with the private key and not executing the print operation based on the print transmitting data when the print transmitting data is not decrypted with the private key.

According to another aspect of the present invention, a print system includes at least one printer and at least one print client connected to the printer via a network, wherein the printer comprises:

a printer position information detector which detects printer position information to specify a place where the printer is installed;

a printer position information storage which acquires printer position information from the printer position information detector in a predetermined cycle and stores the printer position information as storage printer position information;

a statistical printer position information calculator which calculates statistical printer position information, which is a representative value calculated by a statistical method, from the storage printer position information stored by the printer position information storage; and a public key transmitter which generates a public key with a passphrase containing at least the statistical printer position information and transmits the public key to the print client, the print client comprises:

a print transmitting data generator which generates print transmitting data by encrypting print data with the public key; and a print transmitting data transmitter which transmits the print transmitting data to the printer, and the printer further comprises:

a print transmitting data receiver which receives the print transmitting data transmitted by the print client;

a printer position information acquisition which acquires printer position information from the printer position information detector at a point in time when the print transmitting data has been received;

a compensation printer position information generator which regards the statistical printer position information as compensation printer position information if a difference between the printer position information acquired by the printer position information acquisition and the statistical printer position information is within a predetermined range; and a print executor which generates a private key with a passphrase containing at least the compensation printer position information, executes a print operation based on the print transmitting data when the print transmitting data is decrypted with the private key, and does not execute the print operation based on the print transmitting data when the print transmitting data is not decrypted with the private key.

According to another aspect of the present invention, a print system includes at least one printer and at least one print client connected to the printer via a network, wherein the printer comprises:

a printer position information detector which detects printer position information to specify a place where the printer is installed; and a public key transmitter which acquires the printer position information from the printer position information detector, generates a public key with a passphrase containing at least the printer position information, and transmits the public key to the print client, the print client comprises:

a print transmitting data generator which generates print transmitting data by encrypting print data with the public key; and a print transmitting data transmitter which transmits the print transmitting data to the printer, and the printer further comprises:

a print transmitting data receiver which receives the print transmitting data transmitted by the print client;

a printer position information acquisition which acquires printer position information from the printer position information detector at a point in time when the print transmitting data has been received; and a print executor which regards the printer position information acquired by the printer position information acquisition and its surrounding position information as candidates for compensation printer position information, executes a print operation based on the print transmitting data when the print transmitting data is decrypted with a private key generated with a passphrase containing any one of the candidates for the compensation printer position information, and does not execute the print operation based on the print transmitting data when the print transmitting data is not decrypted with any of private keys which are respectively generated with passphrases containing the candidates for the compensation printer position information.

According to another aspect of the present invention, a control method of a print system including at least one printer and at least one print client connected to the printer via a network, comprises the steps of:

acquiring printer position information to specify a place where the printer is installed from a printer position information detector in a predetermined cycle and regarding the printer position information as the first printer position information;

storing the first printer position information as storage printer position information in a printer position information storage;

calculating statistical printer position information, which is a representative value calculated by a statistical method, from the storage printer position information stored in the printer position information storage;

generating a public key with a passphrase containing at least the statistical printer position information;

transmitting the generated public key from the printer to the print client;

generating print transmitting data by encrypting print data with the public key in the print client;

transmitting the print transmitting data from the print client to the printer;

receiving the print transmitting data transmitted from the print client in the printer;

acquiring printer position information from the printer position information detector at a point in time when the print transmitting data has been received and regarding the printer position information as second printer position information;

regarding the statistical printer position information as compensation printer position information if a difference between the second printer position information and the statistical printer position information is within a predetermined range;

generating a private key with a passphrase containing at least the compensation printer position information; and executing a print operation based on the print transmitting data when the print transmitting data is decrypted with the private key, and not executing the print operation based on the print transmitting data when the print transmitting data is not decrypted with the private key.

According to another aspect of the present invention, a control method of a print system including at least one printer and at least one print client connected to the printer via a network, comprises the steps of:

acquiring printer position information to specify a place where the printer is installed from a printer position information detector and regarding the printer position information as first printer position information;

generating a public key with a passphrase containing at least the first printer position information;

transmitting the public key from the printer to the print client;

generating print transmitting data by encrypting print data with the public key in the print client;

transmitting the print transmitting data from the print client to the printer;

receiving the print transmitting data transmitted from the print client in the printer;

acquiring printer position information from the printer position information detector at a point in time when the print transmitting data has been received and regarding the printer position information as second printer position information; and regarding the second printer position information and its surrounding position information as candidates for compensation printer position information, executing a print operation based on the print transmitting data when the print transmitting data is decrypted with a private key which is generated with a passphrase containing at least any one of the candidates for the compensation printer position information, and not executing the print operation based on the print transmitting data when the print transmitting data is not decrypted with any of private keys which are respectively generated with passphrases containing the candidates for the compensation printer position information.

According to another aspect of the present invention, a data receiving device which processes transmitting data, comprises:

a transmitting data receiver which receives the transmitting data;

a position information detector which detects position information to specify a place where the data receiving device is installed;

a position information acquisition which acquires the position information from the position information detector;

a compensation position information generator which generates compensation position information based on the position information in order to compensate for variations in the position information acquired by the position information acquisition; and a process executor which generates a private key with a passphrase containing at least the compensation position information, executes a process based on the transmitting data when the transmitting data is decrypted with the private key, and does not execute the process based on the transmitting data when the transmitting data is not decrypted with the private key.

According to another aspect of the present invention, a control method of a data receiving device which processes transmitting data, comprises the steps of:

receiving the transmitting data;

acquiring position information to specify a place where the data receiving device is installed from a position information detector;

generating compensation position information based on the position information in order to compensate for variations in the acquired position information;

generating a private key with a passphrase containing at least the compensation position information; and executing a process based on the transmitting data when the transmitting data is decrypted with the private key and not executing the process based on the transmitting data when the transmitting data is not decrypted with the private key.

According to another aspect of the present invention, a data transmitting and receiving system includes at least one data receiving device and at least one data transmitting device connected to the data receiving device via a network, wherein the data receiving device comprises:

a position information detector which detects position information to specify a place where the data receiving device is installed;

a position information storage which acquires printer position information from the printer position information detector in a predetermined cycle and stores the printer position information as storage position information;

a statistical position information calculator which calculates statistical position information, which is a representative value calculated by a statistical method, from the storage position information stored by the position information storage; and a public key transmitter which generates a public key with a passphrase containing at least the statistical position information and transmits the public key to the data transmitting device, the data transmitting device comprises:

a transmitting data generator which generates transmitting data by encrypting data with the public key; and a transmitting data transmitter which transmits the transmitting data to the data receiving device, and the data receiving device further comprises:

a transmitting data receiver which receives the transmitting data transmitted by the data transmitting device;

a position information acquisition which acquires position information from the position information detector;

a compensation position information generator which regards the statistical position information as compensation position information if a difference between the position information acquired by the position information acquisition and the statistical position information is within a predetermined range; and a process executor which generates a private key with a passphrase containing at least the compensation position information, executes a process based on the transmitting data when the transmitting data is decrypted with the private key, and does not execute the process based on the transmitting data when the transmitting data is not decrypted with the private key.

According to another aspect of the present invention, a control method of a data transmitting and receiving system including at least one data receiving device and at least one data transmitting device connected to the data receiving device via a network, comprises the steps of:

acquiring position information to specify a place where the data receiving device is installed from a position information detector in a predetermined cycle and regarding the position information as first position information;

storing the first position information as storage position information in a position information storage;

calculating statistical position information, which is a representative value calculated by a statistical method, from the storage position information stored in the position information storage;

generating a public key with a passphrase containing at least the statistical position information;

transmitting the public key from the data receiving device to the data transmitting device;

generating transmitting data by encrypting data with the public key in the data transmitting device;

transmitting the transmitting data from the data transmitting device to the data receiving device;

receiving the transmitting data transmitted from the data transmitting device in the data receiving device;

acquiring position information from the position information detector and regarding the position information as second position information;

regarding the statistical position information as compensation position information if a difference between the second position information and the statistical position information is within a predetermined range;

generating a private key with a passphrase containing at least the compensation position information; and executing a process based on the transmitting data when the transmitting data is decrypted with the private key, and not executing the process based on the transmitting data when the transmitting data is not decrypted with the private key.

According to another aspect of the present invention, a data transmitting and receiving system includes at least one data receiving device and at least one data transmitting device connected to the data receiving device via a network, wherein the data receiving device comprises:

a position information detector which detects position information to specify a place where the data receiving device is installed; and a public key transmitter which acquires the position information from the position information detector, generates a public key with a passphrase containing at least the position information, and transmits the public key to the data transmitting device, the data transmitting device comprises:

a transmitting data generator which generates transmitting data by encrypting data with the public key; and a transmitting data transmitter which transmits the transmitting data to the data receiving device, and the data receiving device further comprises:

a transmitting data receiver which receives the transmitting data transmitted by the data transmitting device;

a position information acquisition which acquires position information from the position information detector; and a process executor which regards the position information acquired by the position information acquisition and its surrounding position information as candidates for compensation position information, executes a process based on the transmitting data when the transmitting data is decrypted with a private key which is generated with a passphrase containing at least any one of the candidates for the compensation position information, and does not execute the process based on the transmitting data when the transmitting data is not decrypted with any of private keys which are respectively generated with passphrases containing the candidates for the compensation position information.

According to another aspect of the present invention, a control method of a data transmitting and receiving system including at least one data receiving device and at least one data transmitting device connected to the data receiving device via a network, comprises the steps of:

acquiring position information to specify a place where the data receiving device is installed from a position information detector and regarding the position information as first position information;

generating a public key with a passphrase containing at least the first position information;

transmitting the public key from the data receiving device to the data transmitting device;

generating transmitting data by encrypting data with the public key in the data transmitting device;

transmitting the transmitting data from the data transmitting device to the data receiving device;

receiving the transmitting data transmitted from the data transmitting device in the data receiving device;

acquiring position information from the position information detector and regarding the position information as second printer position information; and regarding the second position information and its surrounding position information as candidates for compensation position information, executing a process based on the transmitting data when the transmitting data is decrypted with a private key which is generated with a passphrase containing at least any one of the candidates for the compensation position information, and not executing the process based on the transmitting data when the transmitting data is not decrypted with any of private keys which are respectively generated with passphrases containing the candidates for the compensation printer position information.

DETAILED DESCRIPTION OF THE EMBODIMENTS

First Embodiment

In a print system according to the first embodiment of the present invention, printer position information indicating a position where a printer is installed is previously stored, based on the stored printer position information, printer position information on the printer is calculated statistically, and if a difference between the statistically calculated printer position information and printer position information when print data is received is within a predetermined range, the printer position information on the printer is converged on the statistically calculated printer position information. Further details will be given below.

Figure 1:
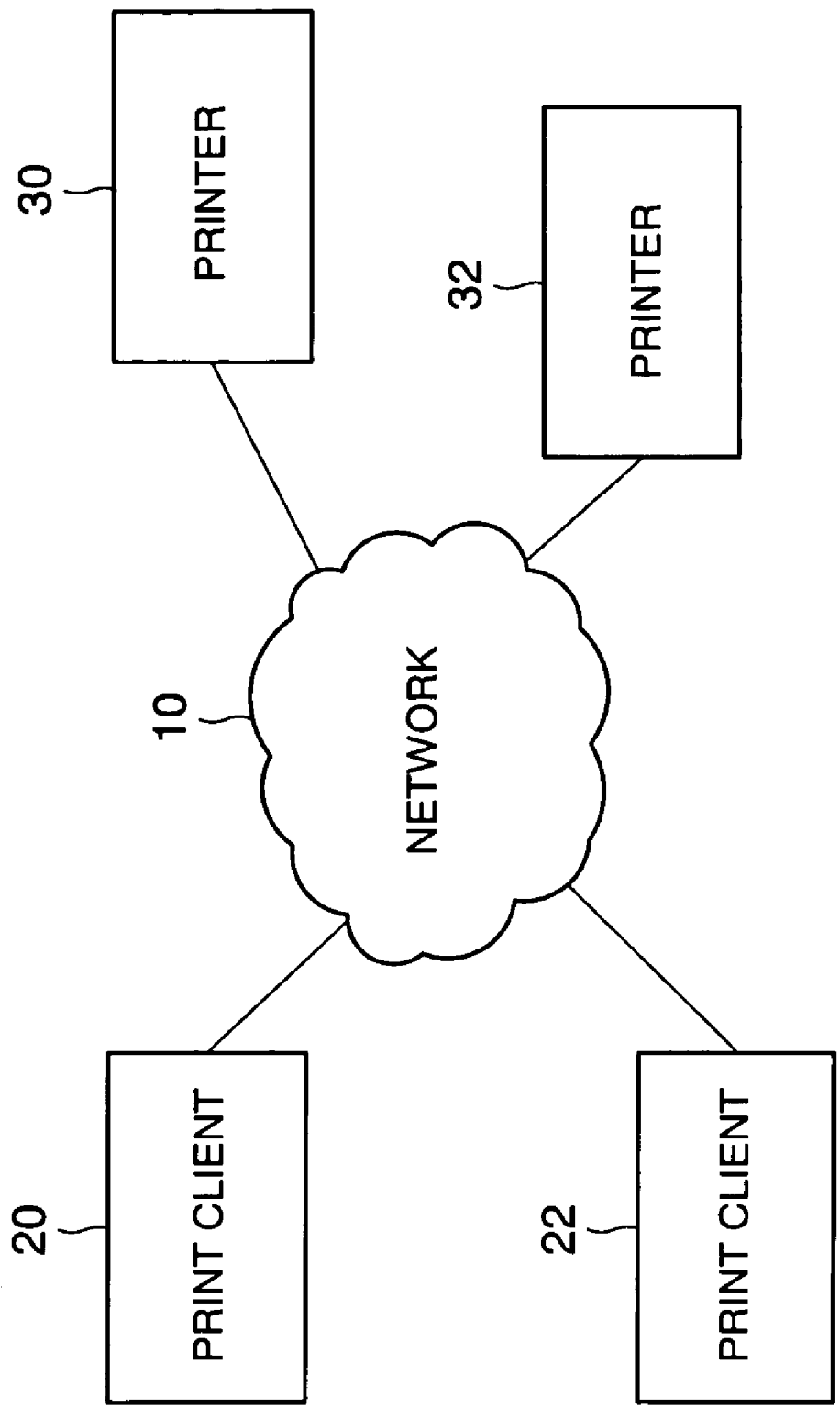
FIG. 1 is a diagram showing an example of the configuration of a print system according to an embodiment of the present invention.

First, the configuration of the print system according to this embodiment will be explained based on FIG. 1. FIG. 1 is a block diagram showing the hardware configuration of the print system according to this embodiment.

As shown in FIG. 1, the print system according to this embodiment includes print clients 20 and 22 connected to a network 10 and printers 30 and 32 also connected to the network 10. In this embodiment, the network 10 is constituted by the Internet using TCP/IP (transmission control protocol/internet protocol). However, the form of the network 10 is not limited to the Internet, and, for example, it may be constituted by a LAN such as Ethernet (registered trademark) or by mixing the Internet and the LAN.

The print client 20 and 22 are each composed of any of various kinds of computers, for example, called a host computer and a personal computer. In this embodiment, in particular, the print clients 20 and 22 generate print transmitting data by encrypting print data and transmit this print transmitting data to the printer 30 and/or the printer 32 via the network 10. The number of print clients connected to the network 10 is optional, and it may be one or more than one. Moreover, the print clients 20 and 22 are each not limited to a computer, and, for example, they may be each a digital camera with a necessity to print a taken image, a content server in which print image data is stored as contents, or the like.

Further, in this embodiment, the printers 30 and 32 are so-called network printers. In this embodiment, particularly when receiving print transmitting data from the print client 20 and/or the print client 22, the printers 30 and 32 each execute a print operation based on print data acquired by decryption only when the print transmitting data can be decrypted.

In this embodiment, the printers 30 and 32 are directly connected to the network 10, and each of the printers 30 and 32 has its own peculiar network address. Accordingly, the print clients 20 and 22 can transmit print transmitting data to the printer 30 or the printer 32 by designating its network address.

Incidentally, the printers 30 and 32 are directly connected to the network 10 in FIG. 1, but the printers 30 and 32 may be connected thereto via a printer server. Moreover, the number of printers connected to the network 10 is optional, and it may be one or more than one.

Figure 2A:
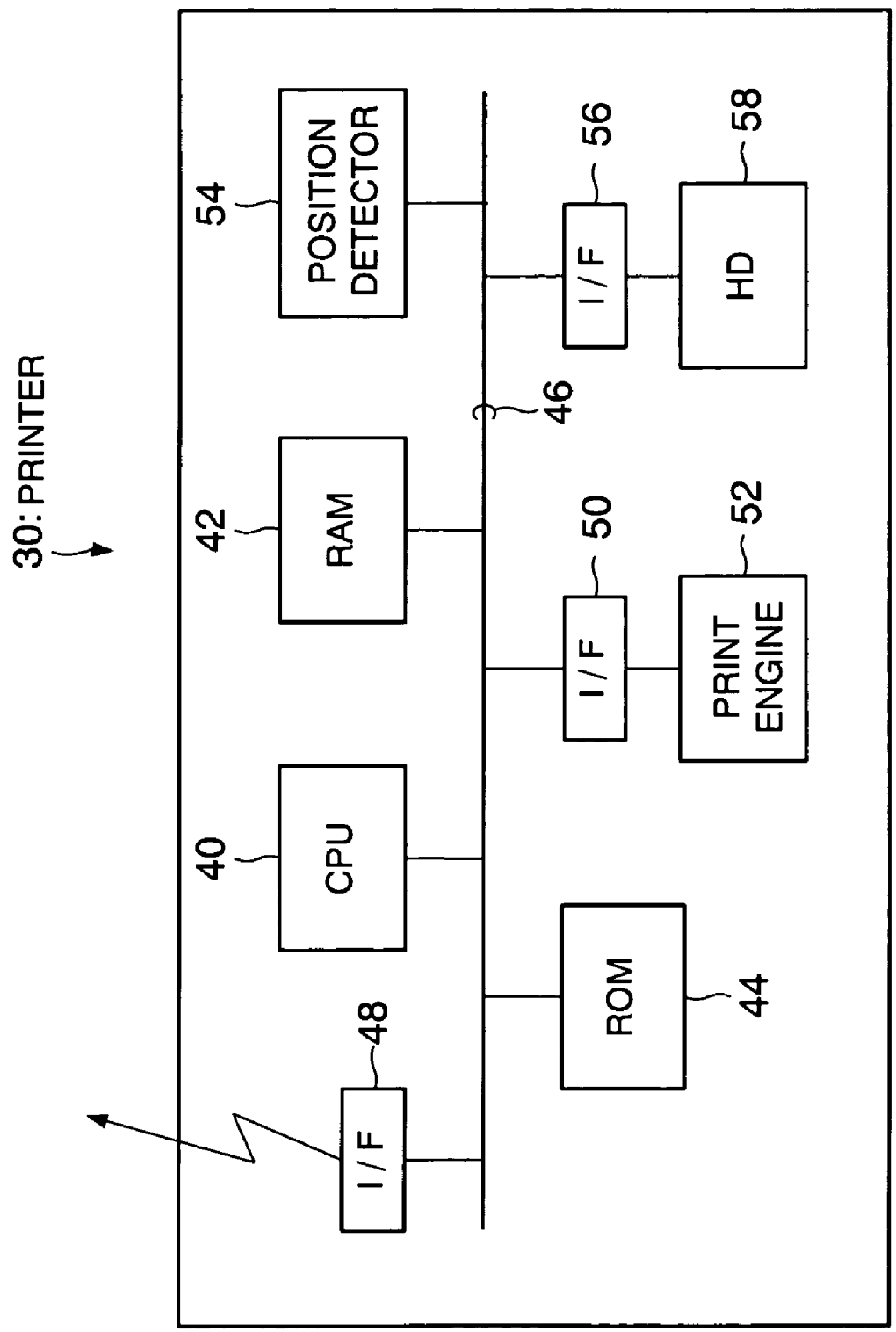
FIG. 2A is a diagram showing an example of the hardware configuration of a printer according to a first embodiment of the present invention.

FIG. 2A is a block diagram explaining the internal configuration of the printer 30. It should be mentioned that the internal configuration of the printer 32 is the same as that of the printer 30.

As shown in FIG. 2A, the printer 30 includes a CPU (Central Processing Unit) 40, a RAM (Random Access Memory) 42, and a ROM (Read Only Memory) 44, and they are connected to each other via an internal bus 46. A communication interface 48 is connected to the internal bus 46, and the printer 30 is connected to the aforementioned network 10 via the communication interface 48. In addition, an interface 50 is connected to the internal bus 46, and a print engine 52 is connected to the interface 50.

Moreover, a position detector 54 is connected to the internal bus 46. This position detector 54 has a function of specifying a position where the printer 30 is installed. In this embodiment, the position detector 54 is constituted, for example, by a GPS (global positioning system), and the latitude, longitude, and altitude of the position where the printer 30 is installed can be specified. It is said that the accuracy of the GPS at the present time is approximately ±10 m in the latitude, the longitude, and the altitude (the X-axis, the Y-axis, and the Z-axis), respectively.

However, the constitution of the position detector 54 is not limited to the constitution using the GPS, and, for example, when the printer 30 is connected to the network 10 by a wireless LAN, the position of the printer 30 may be specified based on a wireless base station which accommodates the printer 30. Alternatively, the position of the printer 30 may be specified by using mobile communication technology including the PHS (Personal Handyphone System).

Further, it is also possible that the position detector 54 includes both a GPS function and a PHS function and normally detects an installation position by the GPS, but when it cannot detect the position by the GPS due to radio wave conditions, it may detect the position by the PHS.

Furthermore, an interface 56 is connected to the internal bus 46 in the printer 30 according to this embodiment, and a hard disk 58 as a rewritable nonvolatile memory device is connected thereto via the interface 56. In this embodiment, this hard disk 58 can be replaced, for example, with an EEPROM (Electrically Erasable Programmable ROM) which is a rewritable nonvolatile memory device.

Figure 2B:
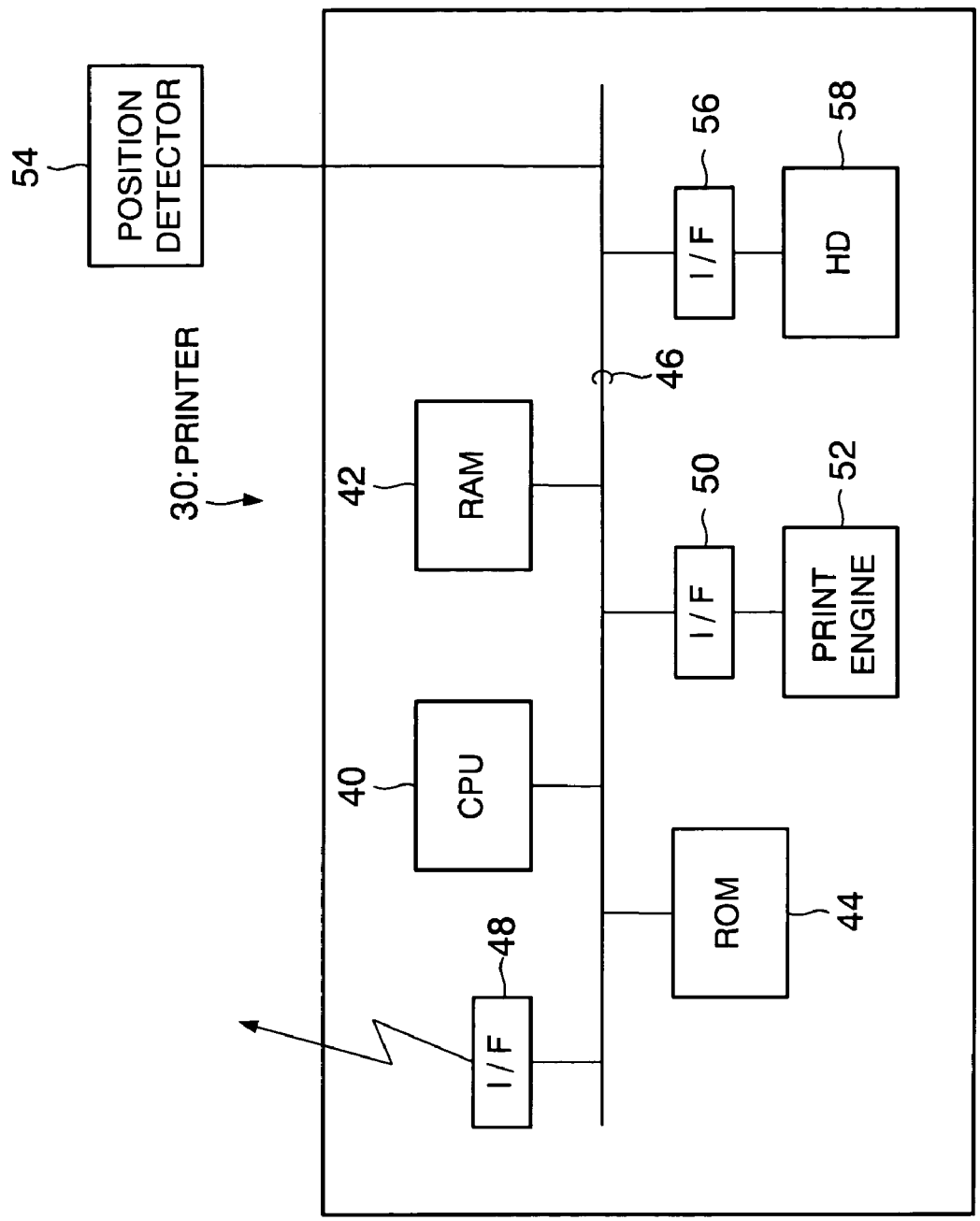
FIG. 2B is a diagram showing a modification of the hardware configuration of the printer.

Furthermore, although the position detector 54 is contained in the printer 30 in FIG. 2A, the position detector 54 may be provided outside the printer 30 as shown in FIG. 2B. For example, it is possible that when the necessity arises, a cellular phone equipped with the GPS is connected to the printer 30, and thereby the printer 30 has a position detection function.

Figure 3:
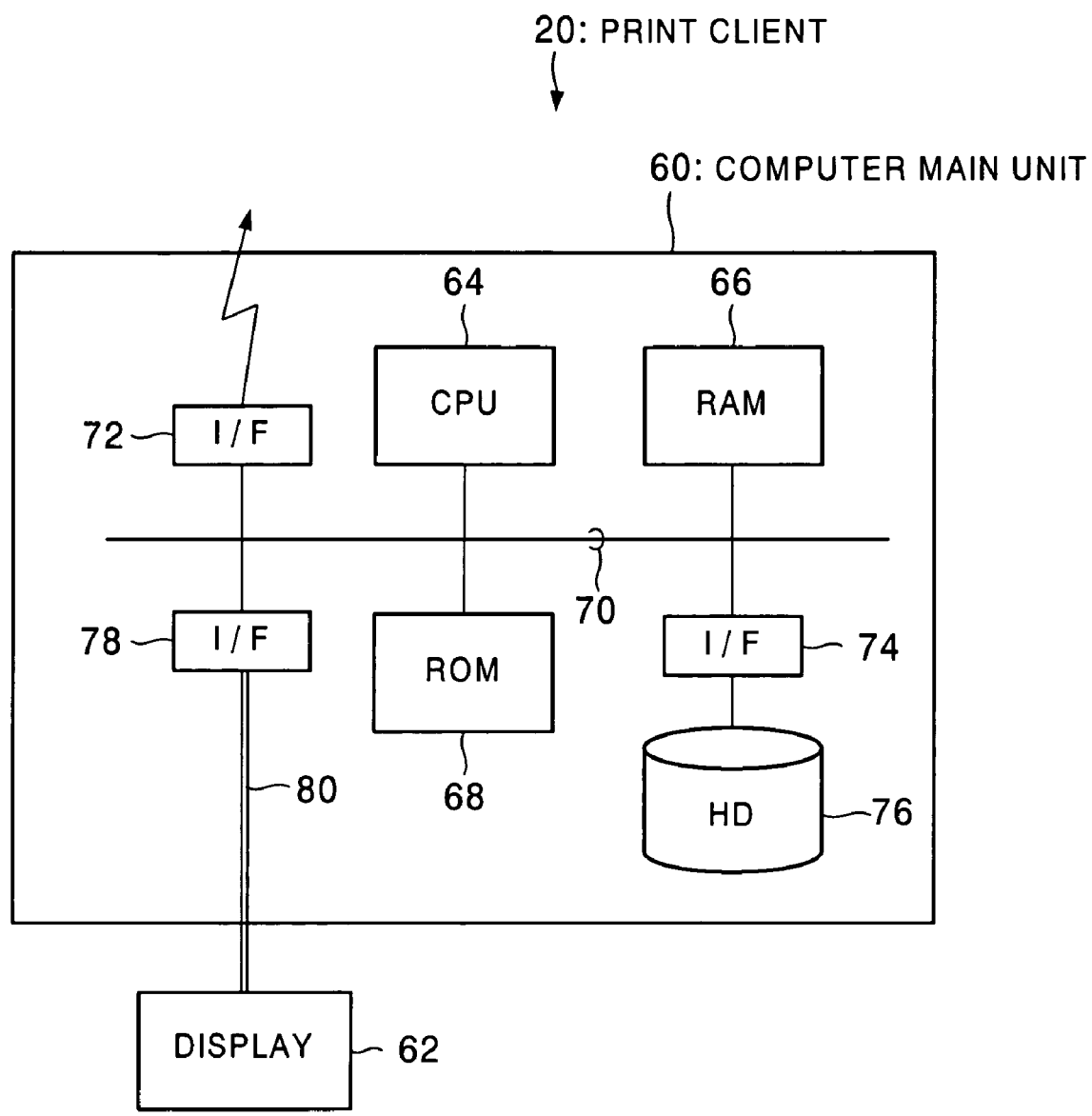
FIG. 3 is a diagram showing an example of the configuration of a print client according to the first embodiment of the present invention.

FIG. 3 is a block diagram explaining the internal configuration of the print client 20. It should be mentioned that the internal configuration of the print client 22 is the same as that of the print client 20 in this embodiment.

As shown in FIG. 3, the print client 20 according to this embodiment includes a computer main unit 60 and a display 62.

The computer main unit 60 includes a CPU 64, a RAM 66, and a ROM 68, and they are connected to each other via an internal bus 70. A communication interface 72 is connected to the internal bus 70, and the print client 20 is connected to the aforementioned network 10 via the communication interface 72.

In addition, an interface 74 is connected to the internal bus 70, and a hard disk 76 which is a large capacity storage is connected to the interface 74. Moreover, an interface 78 is connected to the internal bus 70, and the aforementioned display 62 is connected via a cable 80 which extends from the interface 78.

Next, a brief explanation of a process, for example, when the print client 20 performs printing with the printer 30 in the print system according to this embodiment will be given.

In this case, the print client 20 previously acquires, for example, a public key of the printer 30 from the printer 30.

In this embodiment, the public key is acquired via the network 10. Namely, the printer 30 confirms whether the print client which requests the public key has rightful authority, and only when the print client has rightful authority, the printer 30 notifies the print client of the public key. However, the printer 30 need not necessarily notify the print client 20 of the public key of the printer 30 via the network 10. For example, if a user of the print client 20 has rightful authority, he or she can go to the installation location of the printer 30 and operate the printer 30, whereby it is also possible that the user operates a control panel of the printer 30 and acquires the public key of the printer 30. In this case, the user is required to record the public key of the printer 30 on a record medium such as a flexible disk and allow the print client 20 to read this public key.

Figure 4:
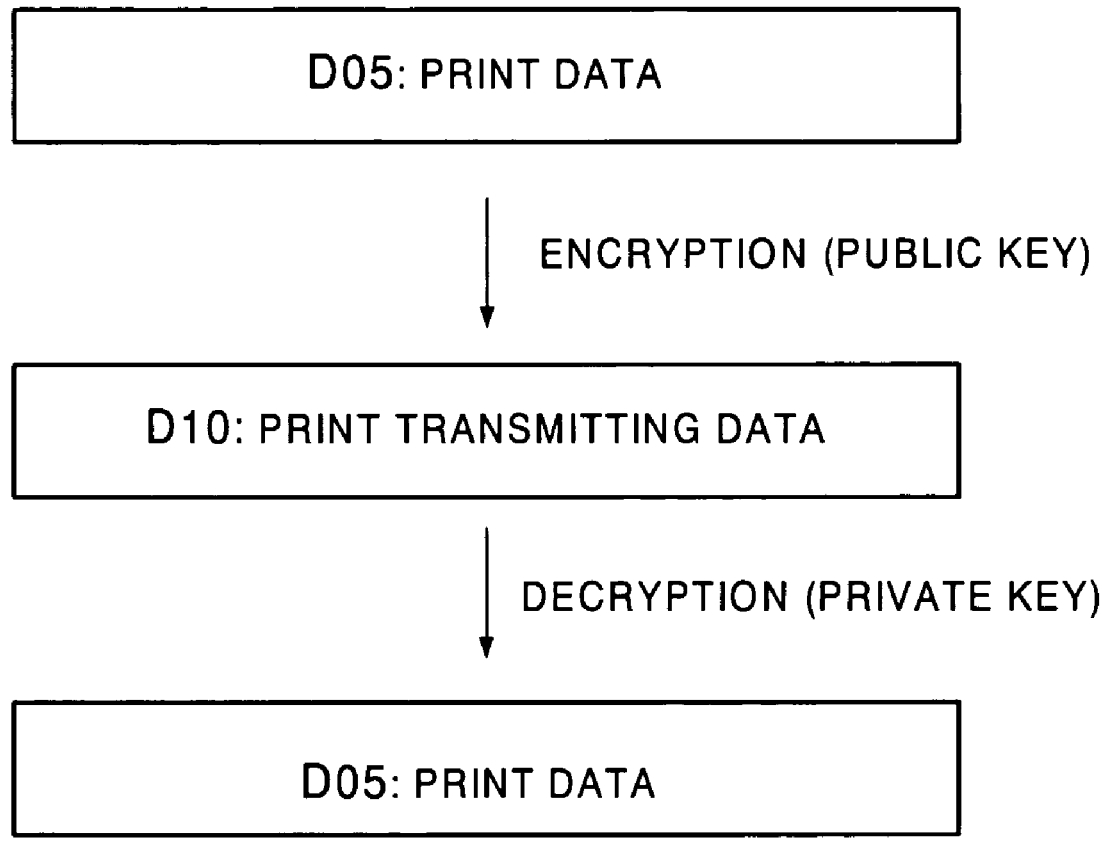
FIG. 4 is a diagram explaining the relation between print data and print transmitting data in the first embodiment of the present invention.

Then, the user of the print client 20 generates data to be printed and designates the printer 30 for the print client 20 to execute a print operation. FIG. 4 is a diagram explaining the flow of encryption and decryption of print data D05.

As shown in FIG. 4, the print client 20 encrypts the print data D05 with the acquired public key to generate print transmitting data D10. Here, the print data D05 means original print data needed for a print operation executed by driving the print engine 52 in the printer 30. Incidentally, the print transmitting data D10 may contain data other than the print data D05 shown in FIG. 4. Subsequently, the print client 20 transmits the generated print transmitting data D10 to the printer 30 via the network 10.

The printer 30 which has received the print transmitting data D10 temporarily stores the received print transmitting data D10 in the RAM 42 as shown in FIG. 2A. The printer 30 then acquires the print data D05 contained in the print transmitting data D10 by decrypting the encrypted print transmitting data D10 with a private key. When the print transmitting data D10 can be decrypted, the print data D05 contained in the print transmitting data D10 is transmitted to the print engine 52 and printed. When the print transmitting data cannot be decrypted, the print operation is not executed.

Incidentally, in this embodiment, the public key and the private key are generated depending on printer position information indicating a position where the printer 30 is installed, but its details will be described later.

Next, processes in the print client 20 or 22 and the printer 30 or 32 when the print client 20 or 22 acquires a public key will be explained in detail.

Figure 5:
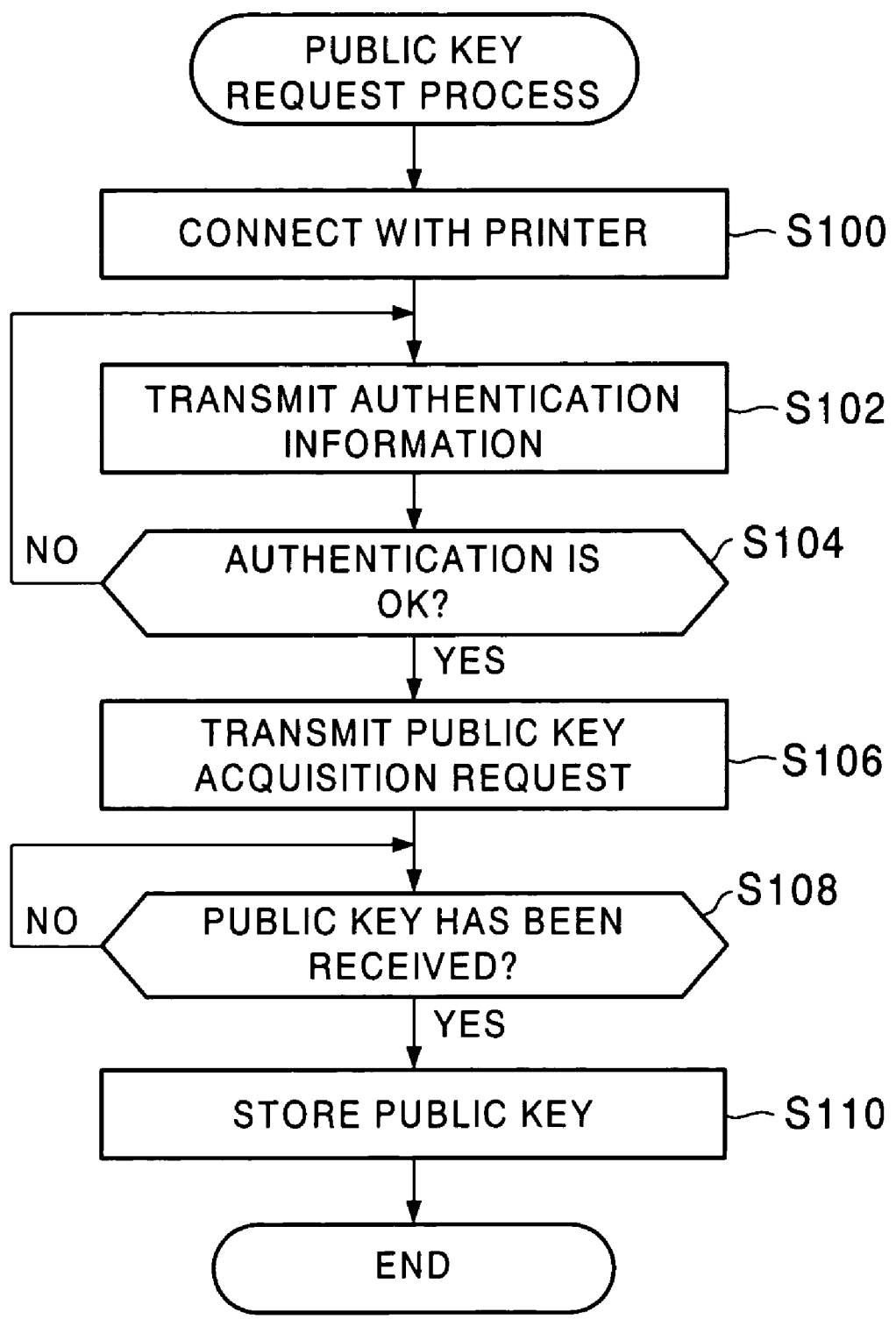
FIG. 5 is a flowchart explaining a public key request process executed by the print client according to the first embodiment of the present invention.

FIG. 5 is a flowchart explaining a public key request process executed by the print client 20 or 22. This public key request process is realized by making the CPU 64 read and execute a public key request program stored in the ROM 68 or the hard disk 76 in the print client. Assuming here a case where the print client 20 makes a request for a public key to the printer 30, the following explanation is given.

As shown in FIG. 5, in the public key request process, the print client 20 first connects with the printer 30 (step S100). In this embodiment, the print client 20 establishes a connection between the print client 20 and the printer 30 by designating the network address of the printer 30.

Thereafter, the print client 20 transmits authentication information to the printer 30 (step S102). In this embodiment, a combination of a client ID to specify the print client and a password is used as the authentication information. Accordingly, the print client 20 transmits the client ID and the password to the printer 30.

Subsequently, the print client 20 receives an authentication result indicating whether authentication is accepted from the printer 30, and judges whether the authentication is accepted by the printer 30 based on the authentication result (step S104). When the authentication is not accepted (step S104: No), the print client 20 repeats the aforementioned process from step S102.

On the other hand, when the authentication is accepted (step S104: Yes), the print client 20 transmits a public key acquisition request to the printer 30 (step S106). Then, the print client 20 judges whether the public key has been received from the printer 30 (step S108). When the public key has not been received from the printer 30 (step S108: No), the print client 20 stands by while repeating step S108.

On the other hand, when the public key has been received from the printer 30 (step S108: Yes), the public key is stored (step S110). In this embodiment, the print client 20 is provided with a public key table TB20 on the hard disk 76, and the acquired public key is stored and held in this public key table TB20.

Figure 6:
FIG. 6 is a diagram showing an example of the structure of a public key table in the print client according to the first embodiment of the present invention.

FIG. 6 is a diagram showing an example of the structure of the public key table TB20. As shown in FIG. 6, the public key table TB20 includes an item D20 which stores information to specify printers and an item D21 which stores acquired public keys corresponding to the printers. As described above, the public key table TB20 can hold public keys concerning plural printers on a printer-by-printer basis. Moreover, by storing the public keys in the public key table TB20 on the hard disk 78 in this manner, even when the print client 20 is powered off and then powered on again, the public key acquired before the power-on can be read from the hard disk 78 and used as it is.

By storing the acquired public key in the public key table TB20, the public key request process shown in FIG. 5 is completed.

Figure 7:
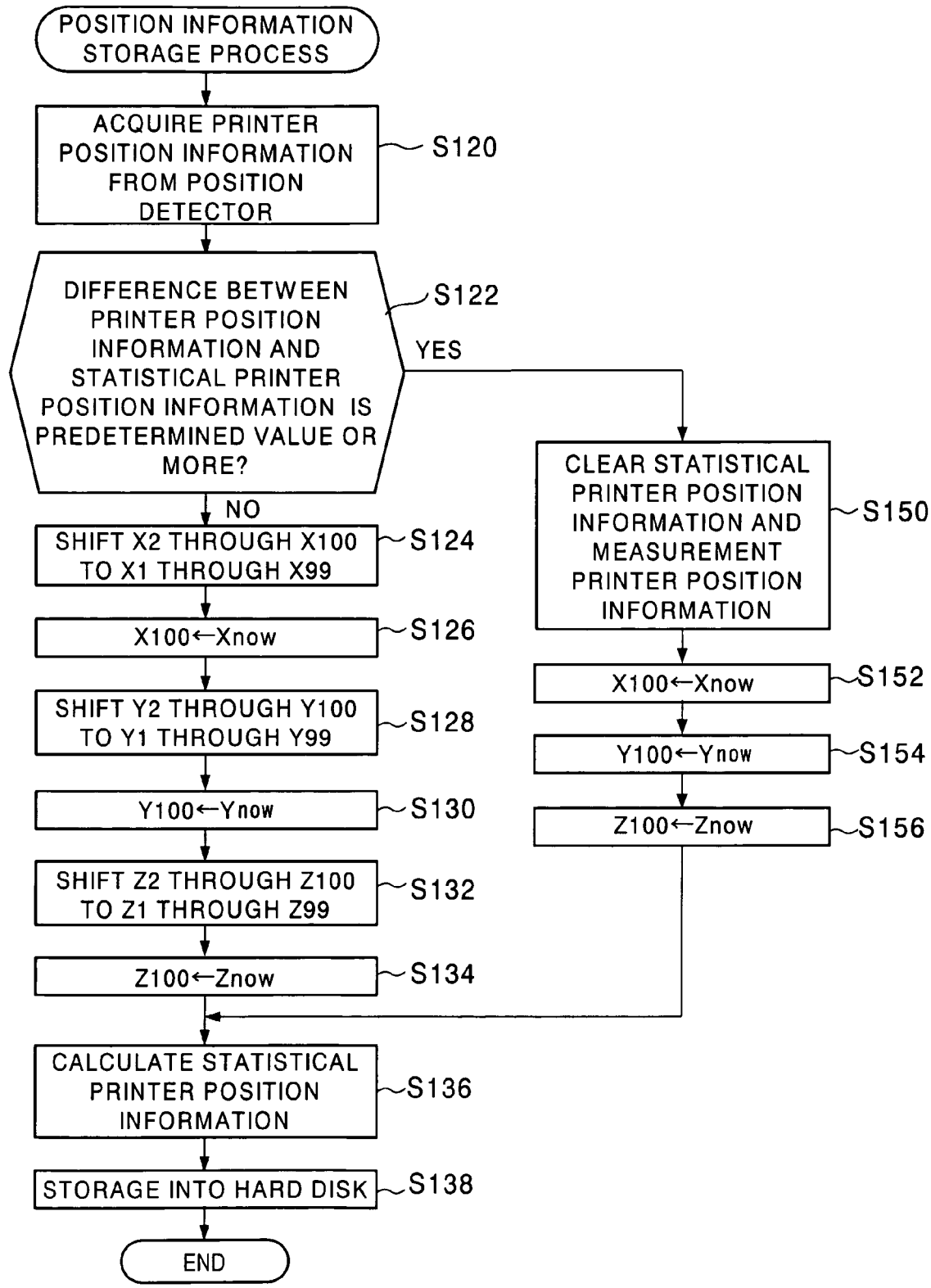
FIG. 7 is a flowchart explaining a position information storage process executed by the printer according to the first embodiment of the present invention.

Next, a position information storage process executed in a predetermined cycle by the printer 30 or 32 will be explained based on FIG. 7. FIG. 7 is a flowchart explaining the position information storage process executed by the printer 30 or 32. In this embodiment, this position information storage process is executed, for example, once a day. Moreover, this position information storage process is realized by making the CPU40 read and execute a position information storage program stored in the ROM 44 or the hard disk 58 in the printer. Here, the position information storage process is explained with the printer 30 as an example.

As shown in FIG. 7, the printer 30 first acquires printer position information Xnow, Ynow, Znow at this point in time on the printer 30 from the print executor 54 (step S120). Then, the printer 30 acquires statistical position information Xd, Yd, Zd stored on the hard disk 58 from the hard disk 58 and judges whether a difference between the statistical printer position information and the printer position information acquired in step S120 is a predetermined value or more (step S122). Here, the statistical printer position information indicates a representative value calculated from hitherto measured printer position information by a statistical method, and the statistical printer position information is calculated in undermentioned step S136. Moreover, the printer position information is specified by the latitude, the longitude, and the altitude (the X-axis, the Y-axis, and the Z-axis) as described above, and hence, in this embodiment, whether a difference between each of Xnow, Ynow, and Znow acquired in step S120 and each of Xd, Yd, and Zd of the statistical printer position information is the predetermined value or more is judged. For example, whether |Xnow−Xd| is 100 m or more, whether |Ynow−Yd| is 100 m or more, and whether |Znow−Zd| is 100 m or more are judged. If any one of them is 100 m or more, it is judged that the difference between the printer position information acquired in step S120 and the statistical printer position information is the predetermined value or more.

When it is judged that the difference between the printer position information Xnow, Ynow, Znow acquired in step S120 and the statistical printer position information Xd, Yd, Zd is not the predetermined value or more (step S122: No), hitherto measured measurement printer position information X2 through X100 is shifted to X1 through X99 in sequence (step S124). Namely, in this embodiment, hitherto measured 100 pieces of printer position information are stored. Newly measured printer position information is stored in X100, Y100, Z100, and each time one piece of printer position information is newly measured, the printer position information is decremented by one. In other word, the oldest printer position information is X1, Y1, Z1, and the printer position information stored in X1, Y1, Z1 is abandoned at a point in time when the next printer position information is acquired.

Then, the printer 30 stores the printer position information Xnow acquired in step S120 in the measurement printer position information X100 (step S126). Subsequently, the printer 30 shifts hitherto measured measurement printer position information Y2 through Y100 to Y1 through Y99 in sequence (step S128). Then, the printer 30 stores the printer position information Ynow acquired in step S120 in the measurement printer position information Y100 (step S130).

Thereafter, the printer 30 shifts hitherto measured measurement printer position information Z2 through Z100 to Z1 through Z99 in sequence (step S132). Then, the printer 30 stores the printer position information Znow acquired in step S120 in the measurement printer position information Z100 (step S134).

Figure 8:
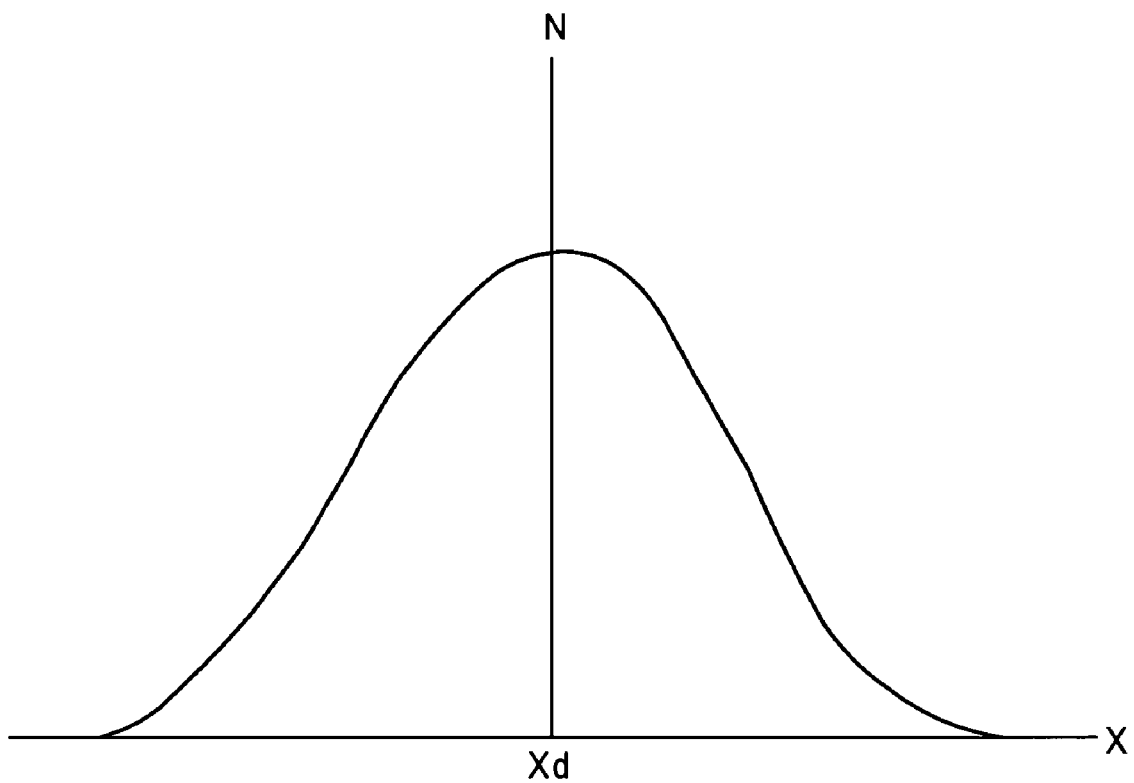
FIG. 8 is a diagram showing an example of the distribution of printer position information stored by the printer according to the first embodiment of the present invention in graphical form.

Then, the printer 30 calculates new statistical printer position information based on the stored measurement printer position information X1 through X100, Y1 through Y100, Z1 through Z100 (step S136). There are various statistical methods for calculating the statistical printer position information. Namely, the measurement printer position information X1 through X100 is graphed, for example, as shown in FIG. 8. In the graph in FIG. 8, the X-axis represents the value of the measurement printer position information X1 through X100, and the Y-axis represents the number N of the measurement printer position information corresponding to its value. When the value of the printer position information X1 through X100 is stored in this manner, the following methods are provided as statistical methods for calculating the representative value.

(1) A mean value of these pieces of measurement printer position information X1 through X100 is found and defined as statistical printer position information Xd. Namely, it can be represented by the following formula (1).

(Formula 1)

$$Xd = \frac{\sum_{i=1}^{100} Xi}{100} \quad (1)$$

(2) A value obtained by adding a minimum value Xmin and a maximum value Xmax of these pieces of measurement printer position information X1 through X100 and then halving the sum is defined as the statistical printer position information Xd. Namely, it can be represented by the following formula (2).

(Formula 2)

$$Xd = \frac{Xmin + Xmax}{2} \quad (2)$$

(3) A median of these pieces of measurement printer position information X1 through X100 is found and defined as the statistical printer position information Xd.

(4) A mode of these measured pieces of measurement printer position information X2 through X100 is found and defined as the statistical printer position information Xd.

In this step S136, the statistical printer position information Yd and Zd are respectively calculated based on the measurement printer position information Y1 through Y100 and Z1 through Z100 by the same statistical method.

Then, the printer 30 stores the measurement printer position information X1 through X100, Y1 through Y100, Z1 through Z100 and the statistical printer position information Xd, Yd, Zd calculated by the statistical method on the hard disk 58 (step S138). These pieces of information are stored on the hard disk 58 in order to prevent the hitherto stored measurement printer position information X1 through X100, Y1 through Y100, Z1 through Z100 and the statistical printer position information Xd, Yd, Zd calculated by the statistical method from being lost even if the printer 30 is powered off. Incidentally, the place where the measurement printer position information X1 through X100, Y1 through Y100, Z1 through Z100 and the statistical printer position information Xd, Yd, Zd are stored is not limited to the hard disk, and, for example, they may be stored in an EEPROM or the like.

On the other hand, when it is judged that the difference between the printer position information Xnow, Ynow, Znow acquired from the position detector 54 and the statistical printer position information Xd, Yd, Zd is the predetermined value or more (step S122: Yes), it can be judged that the printer 30 has been moved to a different place, and hence the hitherto stored measurement printer position information X1 through X100, Y1 through Y100, Z1 through Z100 and the statistical printer position information Xd, Yd, Zd calculated by the statistical method are cleared and erased (step S150).

Then, the printer 30 stores the printer position information Xnow acquired in step S120 in the measurement printer position information X100 (step S152), stores the printer position information Ynow acquired in step S120 in the measurement printer position information Y100 (step S154), and stores the printer position information Znow acquired in step S120 in the measurement printer position information Z100 (step S156). Thereafter, the printer 30 executes the aforementioned process from step S136.

Thus, the position information storage process according to this embodiment is completed.

Figure 9:
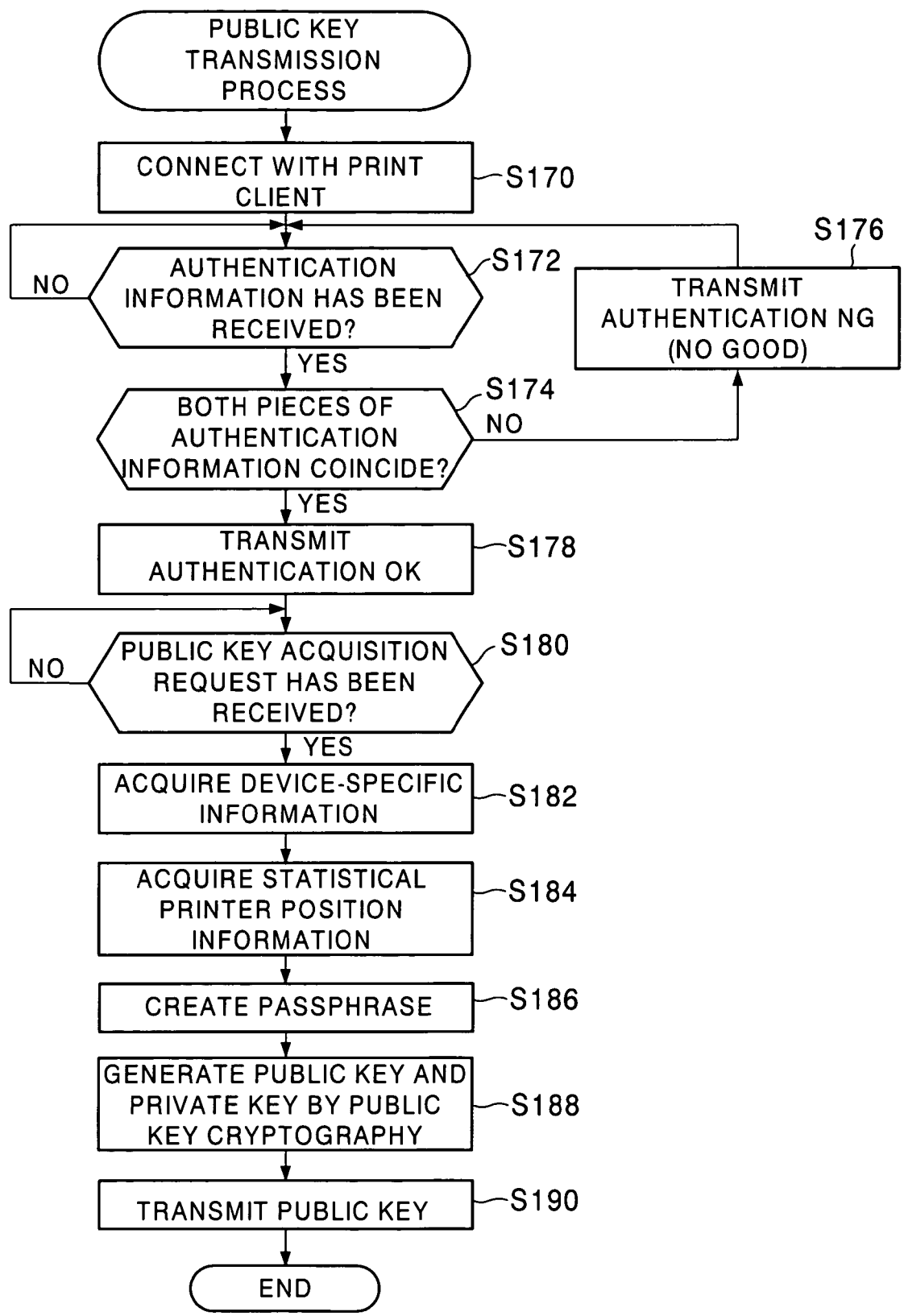
FIG. 9 is a flow chart explaining a public key transmission process executed by the printer according to the first embodiment of the present invention.

Next, a public key transmission process executed by the printer 30 or 32 corresponding to the public key request process in the print client 20 or 22 will be explained based on FIG. 9. FIG. 9 is a flowchart explaining the public key transmission process executed by the printer 30 or 32. The public key transmission process is realized by making the CPU 40 read and execute a public key transmission program stored in the ROM 44 or the hard disk 58 in the printer. Also here, similarly to the above, assuming the case where the print client 20 makes the request for the public key to the printer 30, the following explanation is given.

As shown in FIG. 9, first, the printer 30 establishes a connection with the print client 20 (step S170). This corresponds to the aforementioned step S100 on the print client 20 side. Subsequently, the printer 30 judges whether the authentication information has been received from the print client 20 (step S172). When the authentication information has not been received (step S172: No), the printer 30 stands by while repeating the process in step S172.

On the other hand, when the authentication information has been received from the print client 20 (step S172: Yes), the printer 30 judges whether this authentication information coincides with authentication information which is previously registered with the printer 30 (step S174). Specifically, since the client ID and the password are transmitted as the authentication information from the print client 20 as described above, the printer 30 judges whether these client ID and password coincide with a client ID and a password which are previously registered with the printer 30.

When these two pieces of authentication information do not coincide (step S174: No), the printer 30 transmits the authentication result indicating that the authentication is not accepted to the print client 20 (step S176) and returns to the process in step S172. On the other hand, when these two pieces of authentication information coincide (step S174: Yes), the printer 30 transmits the authentication result indicating that the authentication is accepted to the print client 20 (step S178).

Incidentally, the aforementioned authentication process from step S172 to step S178 can be omitted. In this case, step S102 and step S104 in the public key request process in FIG. 5 can be also omitted.

Thereafter, the printer 30 judges whether the public key acquisition request has been received from the print client 20 (step S180). When the public key acquisition request has not been received (step S180: No), the printer 30 stands by while repeating the process in step S180.

On the other hand, when the public key acquisition request has been received from the print client 20 (step S180: Yes), the printer 30 acquires device-specific information on the printer 30 (step S182). Here, the device-specific information is identification information specifically assigned to the printer 30, and it is, for example, a manufacturer's serial number, an MAC address, or the like of the printer 30.

Then, the printer 30 acquires statistical printer position information stored on the hard disk 58 at this point in time from the hard disk 58 (step S184). Namely, the printer 30 acquires the statistical printer position information which is a statistical representative value of the hitherto measured and stored measurement printer position information.

Subsequently, the printer 30 creates a passphrase with the device-specific information and the statistical printer position information (step S186). There are various methods of creating the passphrase. In this embodiment, the passphrase is created by simply joining the statistical printer position information after the device-specific information. Incidentally, the passphrase may contain data other than these device-specific information and statistical printer position information.

Thereafter, the printer 30 generates a public key and a private key with the created passphrase by a public key cryptography (step S188). The public key cryptography has the property that the same public key and private key are generated again if the same passphrase is used. Then, the printer 30 transmits only the public key out of the generated public key and private key to the print client 20 (step S190). Incidentally, the private key is abandoned without being saved. Thus, the public key transmission process according to this embodiment is completed.

Next, processes in the print client 20 or 22 and the printer 30 or 32 when the print client 20 or 22 wants to perform printing and transmits a print request to the printer 30 or 32 will be explained in detail.

Figure 10:
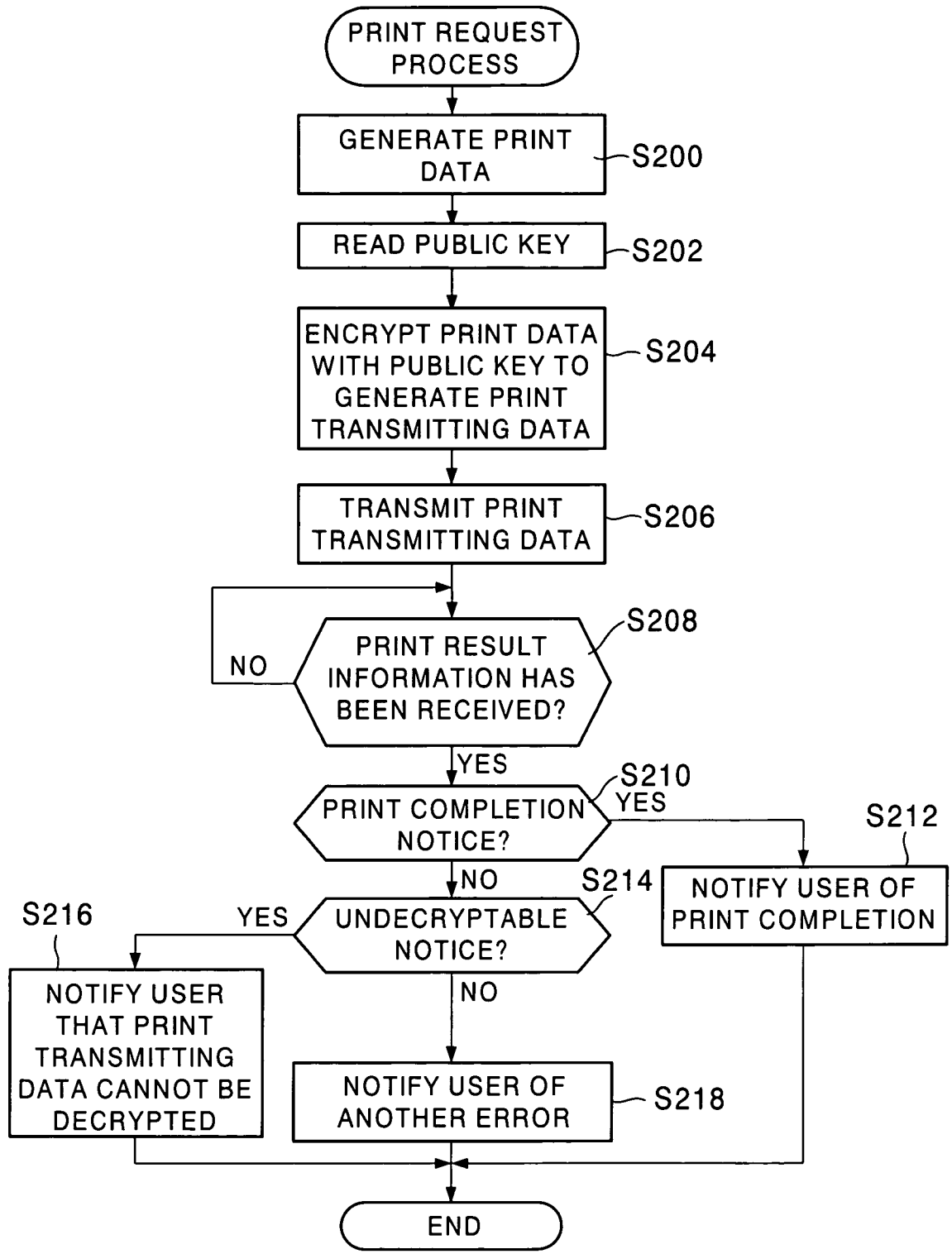
FIG. 10 is a flowchart explaining a print request process executed by the print client according to the first embodiment of the present invention.

FIG. 10 is a flowchart explaining a print request process executed by the print client 20 or 22. This print request process is realized by making the CPU64 read and execute a print request program stored in the ROM 68 or the hard disk 76 of the print client. Here, assuming a case where the print client 20 makes a print request to the printer 30, the following explanation is given.

As shown in FIG. 10, the print client 20 generates the print data D05 based on a print request from the user (step S200). The print data D05 is data necessary for an actual print operation when the printer 30 is an ordinary printer.

Then, the print client 20 reads the public key of the printer 30 from the public key table TB20 on the hard disk 76 (step S202). Subsequently, the print client 20 encrypts the print data D05 with the public key of the printer 30 to generate the print transmitting data D10 (step S204). Incidentally, the print transmitting data D10 may contain data other than the print data D05.

Thereafter, the print client 20 transmits the encrypted print transmitting data to the printer 30 (step S206). Specifically, the print client 20 designates the network address of the printer 30 and sends out the print transmitting data D10 to the network 10.

Subsequently, the print client 20 judges whether print result information has been received from the printer 30 (step S208). When the print result information has not been received (step S208: No), the print client 20 stands by while repeating the process in step S208. On the other hand, when the print result information has been received (step S208: Yes), the print client 20 judges whether the print result information is a print completion notice (step S210).

When this print result information is the print completion notice (step S210: Yes), it means that the printer 30 has properly completed the print operation, and hence the print client 20 notifies the user that the printer 30 has completed the print operation (step S212). On the other hand, when the received print result information is not the print completion notice (step S210: No), whether the print result information is an undecryptable notice is judged (step S214).

When the print result information is the undecryptable notice (step S214: Yes), the print client 20 notifies the user that since the print transmitting data D10 cannot be decrypted by the printer 30, the print operation is not executed (step S216). On the other hand, when the print result information is not the undecryptable notice (step S214: No), it is thought that some other error occurs, and hence the print client 20 gives notice according to the type of the error to the user (step S218).

The print request process in the print client 20 is completed by the notice in step S212, step S216, or step S218.

Figure 11:
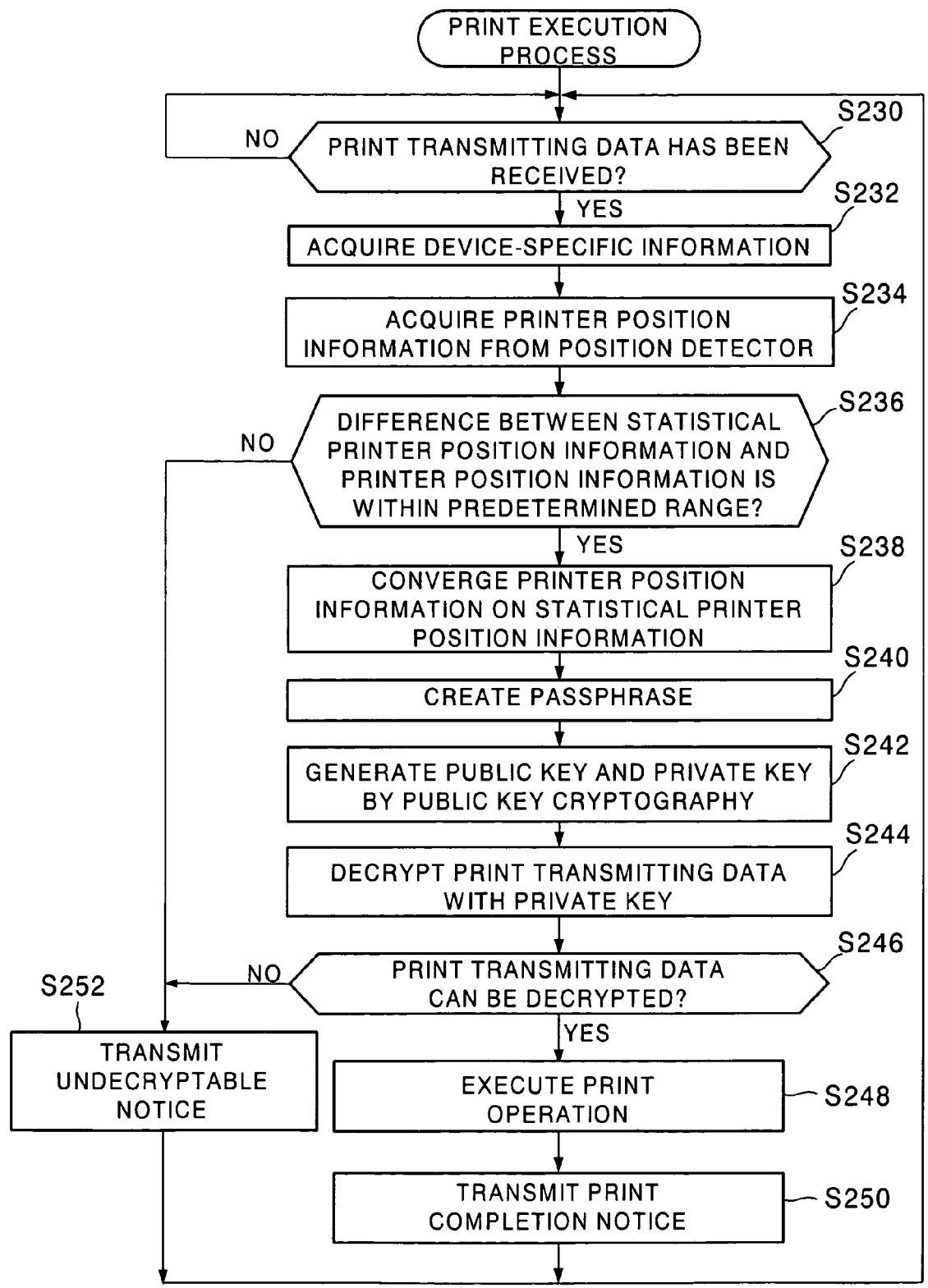
FIG. 11 is a flowchart explaining a print execution process executed by the printer according to the first embodiment of the present invention.

Next, a print execution process executed by the printer 30 or 32 corresponding to the print request process in the print client 20 or 22 will be explained based on FIG. 11. FIG. 11 is a flowchart explaining the print execution process executed by the printer 30 or 32. This print execution process is realized by making the CPU 40 read and execute a print execution program stored in the ROM 44 or the hard disk 58 in the printer 30 or 32. Also here, similarly to the above, assuming the case where the print client 20 makes the print request to the printer 30, the following explanation is given.

As shown in FIG. 11, the printer 30 judges whether the print transmitting data D10 has been received from the network 10 (step S230). When no print transmitting data D10 has been received (step S230: No), the printer 30 stands by while repeating the process in step S230.

On the other hand, when the print transmitting data D10 has been received (step S230: Yes), the printer 30 acquires its own device-specific information (step S232). Subsequently, the printer 30 acquires printer position information Xnow, Ynow, Znow on the printer 30 at this point in time from the position detector 54 (step S234). The reason why the printer position information Xnow, Ynow, Znow is acquired from the position detector 54 each time as described above is that, when the printer 30 is moved to a different place, there is a possibility that the printer 30 is installed in a place where the user does not intend to perform printing, and in order that in such a case, the print operation is not executed by the printer 30.

Figure 12:
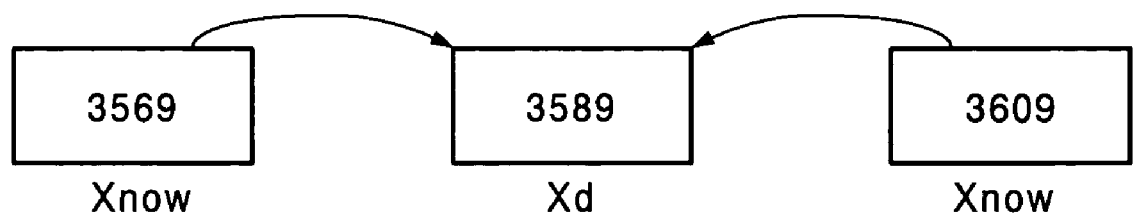
FIG. 12 is a diagram explaining a range within which the printer according to the first embodiment of the present invention regards statistical printer position information as printer position information.

Then, the printer 30 acquires the statistical printer position information Xd, Yd, Zd from the hard disk 58, and judges whether a difference between this statistical printer position information Xd, Yd, Zd and the printer position information Xnow, Ynow, Znow is within a predetermined range (step S236). In this embodiment, the printer 30 judges whether a difference between the statistical printer position information Xd and the printer position information Xnow is within ±20 m. For example, as shown in FIG. 12, when the statistical printer position information Xd has a value of 3589 m, the printer 30 judges whether the printer position information Xnow is a value from 3569 m through 3609 m. Similarly, the printer 30 judges whether a difference between the statistical printer position information Yd and the printer position information Ynow is within ±20 m and whether a difference between the statistical printer position information Zd and the printer position information Znow is within ±20 m.

When the difference between the statistical printer position information Xd, Yd, Zd and the printer position information Xnow, Ynow, Znow is within the predetermined range (step S236), that is, when all of |Xd−Xnow|, |Yd−Ynow|, and |Zd−Znow| are 20 m or less, the printer position information Xnow, Ynow, Znow is converged on the statistical printer position information Xd, Yd, Zd (step S238). For example, in the example in FIG. 12, when the printer position information Xnow is 3609, the printer position information is changed to 3589. The same goes for the printer position information Ynow, Znow. In other words, it means that in this embodiment, when the difference between the statistical printer position information Xd, Yd, Zd and the printer position information Xnow, Ynow, Znow is within the predetermined range, the statistical printer position information Xd, Yd, Zd is used as the printer position information Xnow, Ynow, Znow at this point in time.

Then, the printer 30 creates a passphrase based on the device-specific information and the converged statistical printer position information Xnow, Ynow, Znow (step S240). The method of creating the passphrase needs to be the same method as in step S186 in the aforementioned public key transmission process. This is because, if the passphrases are different, the print transmitting data D10 encrypted with the public key transmitted to the print client cannot be decrypted with a private key.

Thereafter, the printer 30 generates a public key and a private key with the passphrase by the public key cryptography (step S242). Subsequently, the printer 30 decrypts the received print transmitting data D10 with the generated private key and acquires the print data D05 (step S244).

Then, the printer 30 judges whether the print transmitting data D10 can be decrypted with the private key (step S246). When the print transmitting data can be decrypted (step S246: Yes), the printer 30 executes the print operation by driving the print engine 52 based on the acquired print data D05 (step S248). Specifically, the printer 30 performs a language interpretation of the print data D05 and generates print request data fitting the print engine 52. Then, by transmitting this print request data to the print engine 52, print sheets and so on are printed by the print engine 52.

As can be seen from the above, in this embodiment, the private key is generated with the passphrase containing at least the printer position information converged in step S238, and when the print transmitting data D10 can be decrypted with this private key, it is judged that the print transmitting data D10 matches the printer position information.

At a point in time when the print operation has been properly completed, the printer 30 transmits the print completion notice that the print operation has been properly completed as the print result information to the print client 20 (step S250). Then, the printer 30 returns to the aforementioned process in step S230.

Contrary to this, when it is judged in step S246 that the print transmitting data D10 cannot be decrypted (step S246: No), the printer 30 transmits the undecryptable notice as the print result information to the print client 20 (step S252). Namely, in this embodiment, when the private key is generated with the passphrase containing at least the printer position information converged in step S238 but the print transmitting data cannot be decrypted with this private key, it is judged that that the print transmitting data does not match the printer position information. Then, the printer 30 returns to the aforementioned process in step S230.

Moreover, also when the printer 30 judges that the difference between the statistical printer position information Xd, Yd, Zd and the printer position information Xnow, Ynow, Znow is not within the predetermined range (step S236: No), the printer 30 transmits the undecryptable notice as the print result information to the print client 20 in step S252.

As described above, according to the print system of this embodiment, the print client 20 or 22 can limit a printer capable of printing the transmitted encrypted print transmitting data D10 based on printer position information, so that the execution of a print operation by a printer installed in a position where the user of the print client 20 or 22 does not intend to perform printing can be avoided. For example, even if the print transmitting data D10 is transmitted by mistake to the printer 30 from the print client 20 when the printer 30 has been moved to a different place but the network address of the printer 30 in the network 10 remains unchanged, the printer position information is changed in the printer 30, whereby the passphrase created in step S240 is different from that before the movement. Hence, the print transmitting data D10 cannot be decrypted with a private key generated with this passphrase, and thereby the print operation cannot be executed by the printer 30. Consequently, the security of the print data D05 can be enhanced.

On the other hand, also on the printer 30 or 32 side, the transmission of print data to the printer 30 or 32 by somebody who is not duly authorized to perform printing with the printer 30 or 32 and the execution of a large print operation by the printer 30 or 32 can be avoided.

Moreover, in this embodiment, the passphrase contains the device-specific information, and hence even if a third party can know the position of the printer 30 for some reason, the passphrase used in the printer 30 cannot be specified unless the device-specific information on the printer 30 is known. Consequently, the possibility that the third party who has no rightful authority performs printing with the printer 30 can be greatly reduced.

Further, according to the printer 30 or 32 of this embodiment, the difference between the printer position information Xnow, Ynow, Znow acquired from the position detector 54 and the statistical printer position information Xd, Yd, Zd is respectively within the predetermined range, the printer position information Xnow, Ynow, Znow on the printer 30 at this point in time is converged on the statistical printer position information Xd, Yd, Zd. Hence, even if, in relation to the detection accuracy of the position detector 54, a discrepancy occurs between the printer position information used when the public key is generated in the public key transmission process and the printer position information used when the private key is generated in the print execution process, it is possible to correct the discrepancy and generate the private key capable of decrypting the print transmitting data D10. Consequently, the print transmitting data D10 can be decrypted smoothly.

Second Embodiment

In the second embodiment of the present invention, when decrypting the received print transmitting data D10, the printer 30 generates plural passphrases containing not only printer position information acquired from the position detector 54 but also position information around this printer position information, and executes a print operation when the print transmitting data D10 can be decrypted with any of private keys generated using these passpharses. Further details will be given below.

It should be mentioned that the hardware configurations of the printers 30 and 32 according to this embodiment are the same as that in FIG. 2A or FIG. 2B described above, and that the hardware configurations of the aforementioned print clients 20 and 22 are the same as that in FIG. 3. Moreover, processes executed by the print client 20 or 22 are the same as those in the aforementioned first embodiment. However, processes executed by the printer 30 or 32 are different from those in the aforementioned first embodiment.

Figure 13:
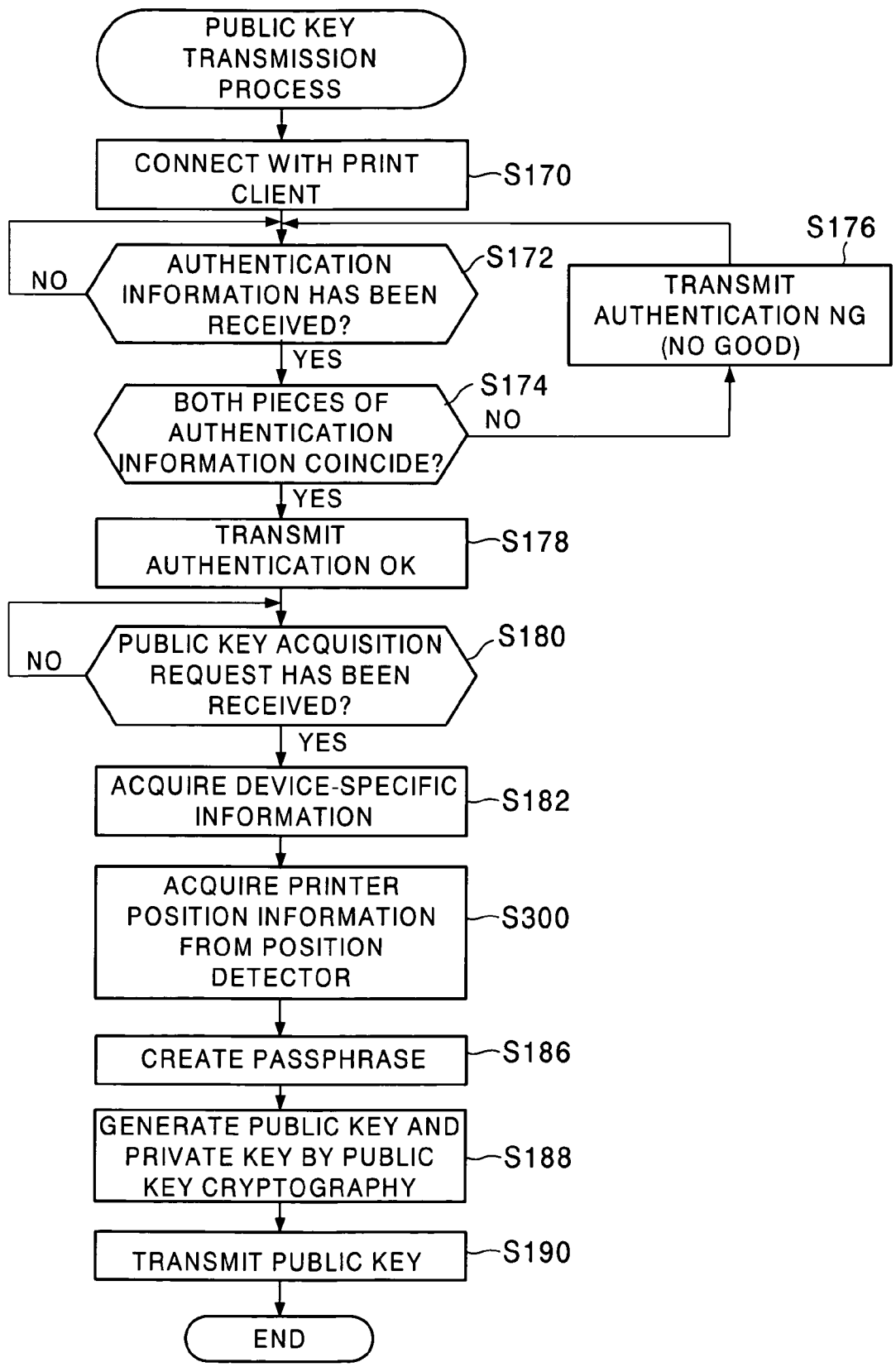
FIG. 13 is a flowchart explaining a public key transmission process executed by a printer according to a second embodiment of the present invention.

FIG. 13 is a flowchart explaining a public key transmission process executed by the printer 30 or 32 according to this embodiment and corresponds to FIG. 9 described above. As shown in FIG. 13, in the public key transmission process executed by the printer 30 or 32 of this embodiment, the process in step S300 executed after step S182 is different from that in the first embodiment.

Namely, after acquiring device-specific information in step S182, the printer 30 or 32 acquires printer position information from the position detector 54 (step S300). More specifically, the printer 30 or 32 acquires printer position information on the printer at this point in time. Then, in step S186, a passphrase is created based on the device specific information and the printer position information acquired in step S300. In other respects, the public key transmission process is the same as that in the aforementioned first embodiment.

Figure 14:
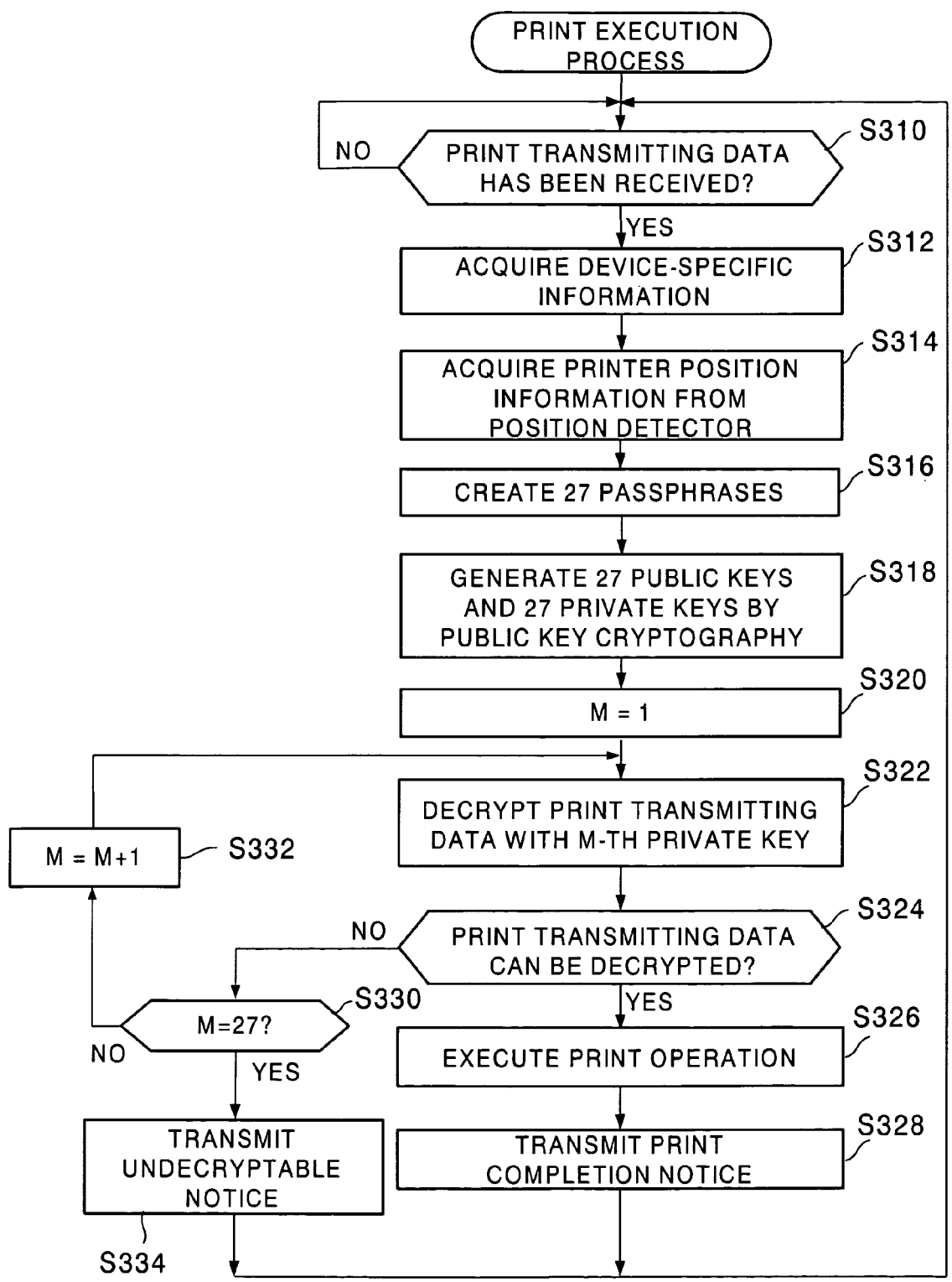
FIG. 14 is a flowchart explaining a print execution process executed by the printer according to the second embodiment of the present invention.

FIG. 14 is a flowchart explaining a print execution process executed by the printer 30 or 32 corresponding to the print request process in the print client 20 or 22, and corresponds to FIG. 11. This print execution process is realized by making the CPU 40 read and execute a print execution program stored in the ROM 44 or the hard disk 58 in the printer 30 or 32. Also here, similarly to the above, assuming the case where the print client 20 makes a print request to the printer 30, the following explanation is given.

As shown in FIG. 14, the printer 30 judges whether the print transmitting data D10 has been received from the network 10 (step S310). When no print transmitting data D10 has been received (step S310: No), the printer 30 stands by while repeating the process in step S310.

On the other hand, when the print transmitting data D10 has been received (step S310: Yes), the printer 30 acquires its own device-specific information (step S312). Subsequently, the printer 30 acquires the printer position information Xnow, Ynow, Znow on the printer 30 at this point in time from the position detector 54 (step S314). The reason why the printer position information Xnow, Ynow, Znow is acquired from the position detector 54 each time as described above is that, when the printer 30 is moved to a different place, there is a possibility that the printer 30 is installed in a place where the user does not intend to perform printing, and in order that in such a case, the print operation is not executed by the printer 30.

Then, the printer 30 creates 27 passphrases (step S316). In this embodiment, the passphrase is created by joining printer position information after the device-specific information, and in addition to the printer position information Xnow, Ynow, Znow acquired in step S314, passphrases are also created with position information on its surrounding 26 places as the joined printer position information.

Figure 15:
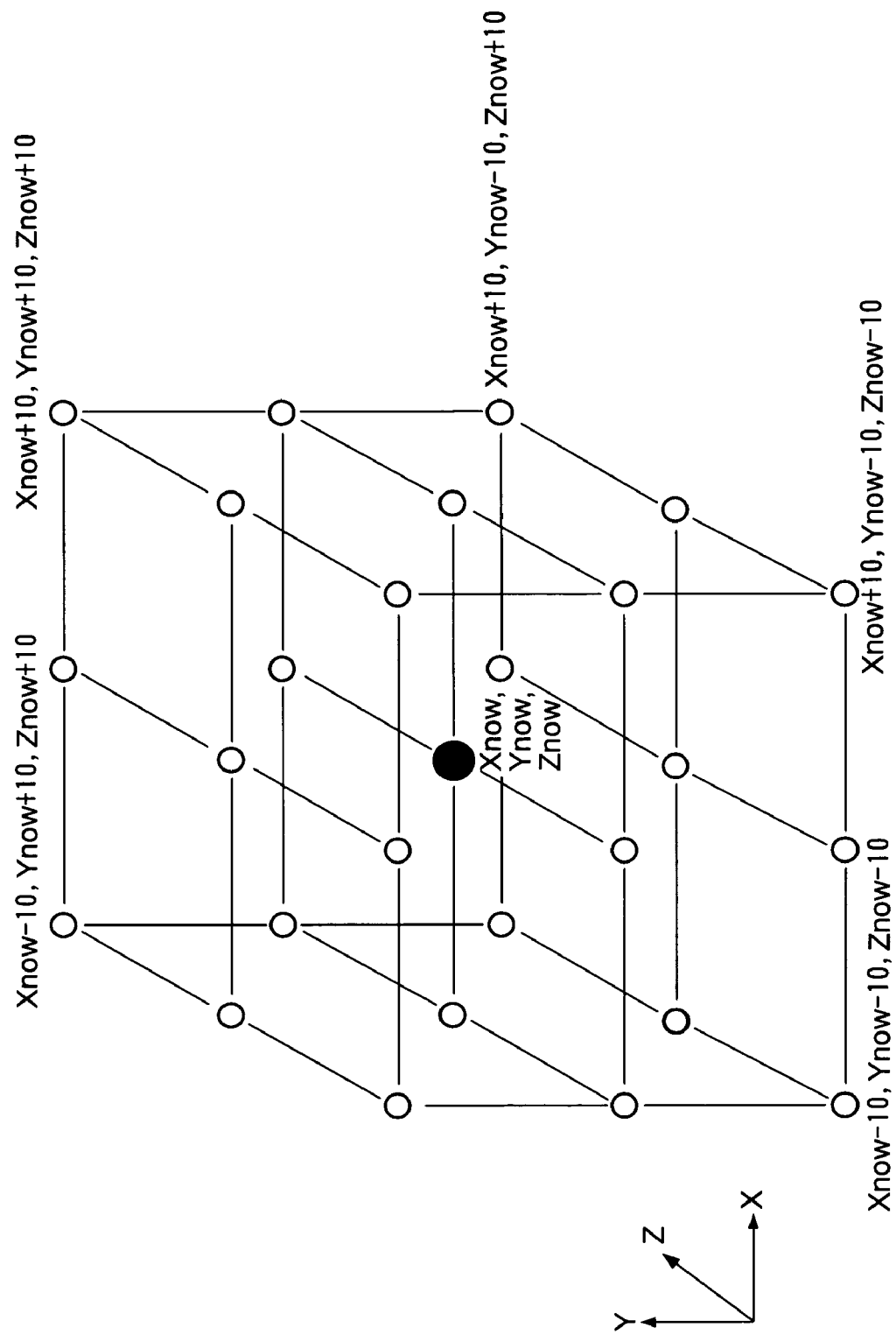
FIG. 15 is a diagram explaining the positional relation among 26 places around printer position information which are selected by the printer according to the second embodiment of the present invention.

FIG. 15 is a conceptual diagram explaining the relation between the printer position information Xnow, Ynow, Znow and the position information on its surrounding 26 places. As shown in FIG. 15, the printer position information Xnow, Ynow, Znow acquired from the position detector 54 in step S314 is set in a central position. In this case, 26 pieces of position information each shifted by one minimum measurement unit of the position detector 54 exist around the printer position information Xnow, Ynow, Znow. Hence, in this embodiment, in order that, even when the printer position information of the position detector 54 changes compared with when a public key has been transmitted, a private key capable of decrypting the print transmitting data D10 encrypted based on this public key is found out, the passphrases on places around the printer position information Xnow, Ynow, Znow are also created with the respective places as position information.

In the example in FIG. 15, the minimum measurement unit of the position detector 54 is 10 m. Accordingly, in addition to the printer position information Xnow, Ynow, Znow, the following printer position information on 26 places are set.

(1) printer position information Xnow+10, Ynow, Znow
(2) printer position information Xnow, Ynow+10, Znow
(3) printer position information Xnow, Ynow, Znow+10
(4) printer position information Xnow−10, Ynow, Znow
(5) printer position information Xnow, Ynow−10, Znow
(6) printer position information Xnow, Ynow, Znow−10
(7) printer position information Xnow+10, Ynow+10, Znow
(8) printer position information Xnow+10, Ynow, Znow+10
(9) printer position information Xnow, Ynow+10, Znow+10
(10) printer position information Xnow−10, Ynow−10, Znow
(11) printer position information Xnow−10, Ynow, Znow−10
(12) printer position information Xnow, Ynow−10, Znow−10
(13) printer position information know+10, Ynow−10, Znow

(14) printer position information Xnow+10, Ynow, Znow−10
(15) printer position information Xnow, Ynow+10, Znow−10
(16) printer position information Xnow−10, Ynow+10, Znow
(17) printer position information Xnow−10, Ynow, Znow+10
(18) printer position information Xnow, Ynow−10, Znow+10
(19) printer position information Xnow+10, Ynow+10, Znow+10
(20) printer position information Xnow+10, Ynow+10, Znow−10
(21) printer position information Xnow+10, Ynow−10, Znow+10
(22) printer position information Xnow−10, Ynow+10, Znow+10
(23) printer position information Xnow+10, Ynow−10, Znow−10
(24) printer position information Xnow−10, Ynow−10, Znow+10
(25) printer position information Xnow−10, Ynow+10, Znow−10
(26) printer position information Xnow−10, Ynow−10, Znow−10

Thereafter, as shown in FIG. 14, the printer 30 generates public keys and private keys with 27 passphrases generated in step S316 by the public key cryptography (step S318). Accordingly, in this embodiment, 27 public keys and 27 private keys are generated. Subsequently, the printer 30 sets a counter M to 1 (step S320).

Then, the printer 30 decrypts the print transmitting data D10 with an M-th private key (step S322). The order of using respective private keys is optional, but in this embodiment, the private key generated with the printer position information Xnow, Ynow, Znow is used first. This is because, under ordinary circumstances, it is thought that the possibility that the print transmitting data D10 can be decrypted using a private key generated with printer position information acquired at this point in time is the highest, although it depends on the repeatability of the position detector 54.

Thereafter, the printer 30 judges whether the print transmitting data D10 can be decrypted with the private key (step S324). When the print transmitting data D10 can be decrypted (step S324: Yes), the printer 30 executes the print operation by driving the print engine 52 based on the acquired print data D05 (step S326). Specifically, the printer 30 performs a language interpretation of the print data D05 and generates print request data fitting the print engine 52. Then, by transmitting this print request data to the print engine 52, print sheets and so on are printed by the print engine 52.

As can be seen from the above, in this embodiment, the passphrases containing at least printer position information on 27 places are generated in step S316, 27 private keys are generated in step S318 by using these passphrases, and when the print transmitting data D10 can be decrypted with any of these 27 private keys, it is judged that the print transmitting data D10 matches the printer position information.

At a point in time when the print operation has been properly completed, the printer 30 transmits a print completion notice that the print operation has been properly completed as a print result information to the print client 20 (step S328). Then, the printer 30 returns to the aforementioned process in step S310.

Contrary to this, when it is judged in step S324 that the print transmitting data D10 cannot be decrypted (step S324: No), the printer 30 judges whether the counter M is 27 (step S330). When the counter M is not 27 (step S330: No), that is, when the generated private keys are still left, one is added to the counter M (step S332), and the printer 30 repeats the aforementioned process from step S322.

On the other hand, when the counter M is 27 (step S330: Yes), that is, when no generated private key is left, the printer 30 transmits an undecryptable notice as the print result information to the print client 20 (step S334). Namely, the received print transmitting data D10 cannot be decrypted with any of the generated 27 private keys, and hence the printer 30 judges that the print transmitting data D10 does not match the printer position information. Then, the printer 30 returns to the aforementioned process in step S310.

As described above, according to the print system of this embodiment, the security of the print data D05 transmitted by the print client 20 or 22 can be enhanced and besides the security of the printer 30 or 32 itself can be enhanced.

Further, according to the printer 30 of this embodiment, passphrases are created with the printer position information Xnow, Ynow, Znow acquired from the position detector 54 and position information around this printer position information Xnow, Ynow, Znow, plural private keys are generated with the created passphrases, and whether the print transmitting data D10 can be decrypted with any of the generated private keys is tried. Hence, even if, in relation to the detection accuracy of the position detector 54, a discrepancy occurs between the printer position information used when the public key is generated in the public key transmission process and the printer position information used when the private key is generated in the print execution process, it is possible to absorb the discrepancy and generate the private key capable of decrypting the print transmitting data D10. Consequently, the print transmitting data D10 can be decrypted smoothly.

Third Embodiment

In the third embodiment of the present invention, a modification is made to the aforementioned second embodiment. Specifically, one of 27 pieces of printer position information is selected, based on the selected printer position information, the creation of a passphrase, the generation of a private key, and the decryption of the print transmitting data D10 are performed, and when the print transmitting data D10 cannot be decrypted, one of the remaining pieces of printer position information is selected. Further details will be given below.

Figure 16:
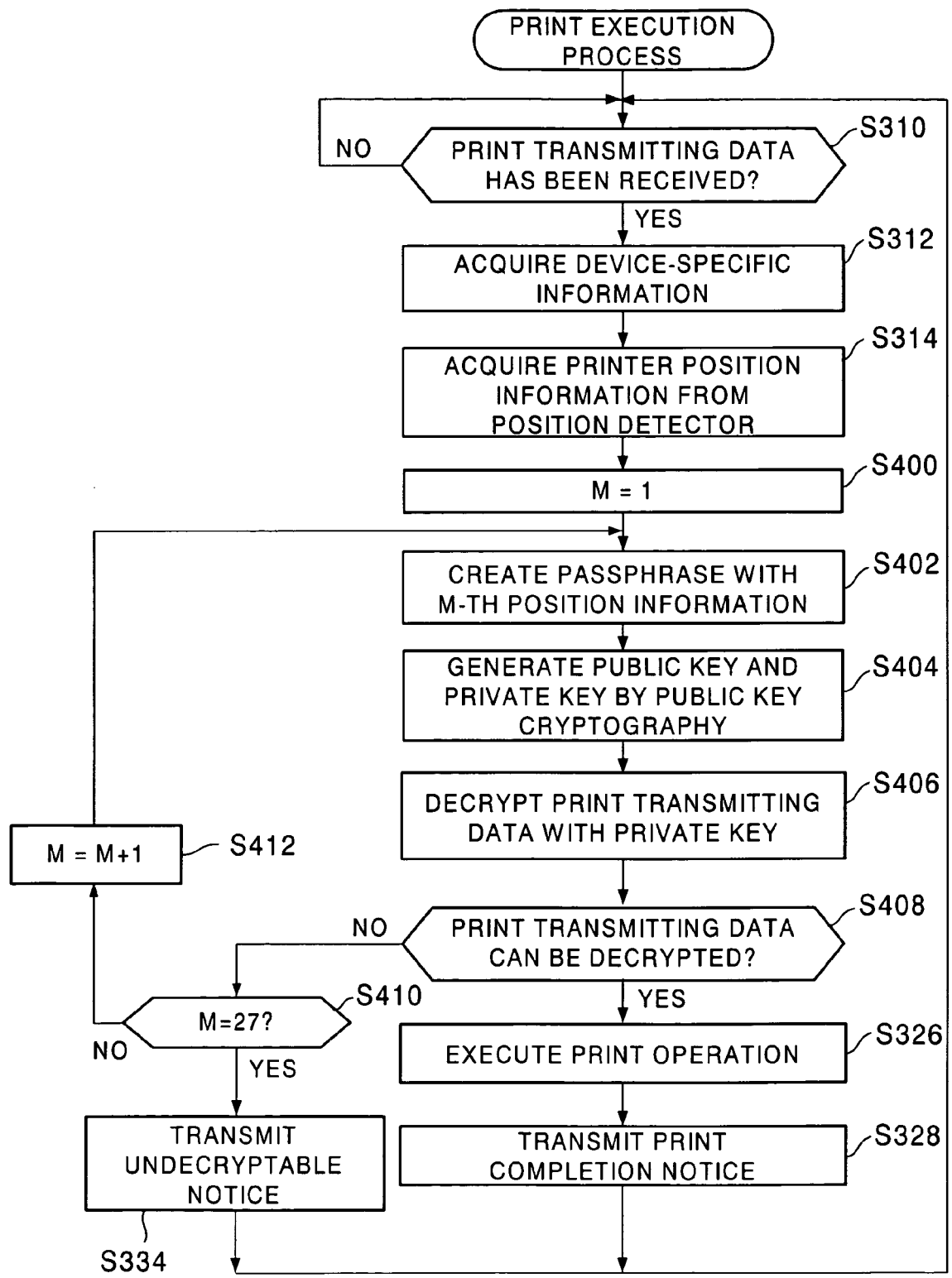
FIG. 16 is a flowchart explaining a print execution process executed by a printer according to a third embodiment of the present invention.

A print system according to this embodiment is the same as that in the aforementioned second embodiment except for a print execution process executed by the printer 30 or 32. FIG. 16 is a flowchart explaining the contents of the print execution process according to this embodiment, and corresponding to FIG. 14.

As shown in FIG. 16, in this embodiment, after acquiring the printer position information from the position detector 54 in step S314, the printer 30 sets the counter M to 1 (step S400).

Then, the printer 30 creates a passphrase with M-th position information (step S402). In this embodiment, the passphrase is created by joining the M-th printer position information after the device-specific information. The order of selecting from among 27 pieces of printer position information is optional, but in this embodiment, the printer position information Xnow, Ynow, Znow is selected first.

This is because, under ordinary circumstances, it is thought that the possibility that the print transmitting data D10 can be decrypted using a private key generated with printer position information acquired at this point in time is the highest, although it depends on the repeatability of the position detector 54.

Thereafter, the printer 30 generates a public key and a private key with one passphrase created in step S402 by the public key cryptography (step S404). Subsequently, the printer 30 decrypts the print transmitting data D10 with the generated one private key (step S406).

Then, the printer 30 judges whether the print transmitting data D10 can be decrypted with the private key (step S408). When the print transmitting data D10 can be decrypted (step S408: Yes), the printer 30 executes the print operation as in the aforementioned second embodiment (step S326), and transmits the print completion notice as the print result information to the print client 20 (step S328).

Contrary to this, when it is judged in step S408 that the print transmitting data D10 cannot be decrypted (step S408: No), the printer 30 judges whether the counter M is 27 (step S410). When the counter M is not 27 (step S410: No), that is, when the unused position information is still left, one is added to the counter M (step S412), and the printer 30 repeats the aforementioned process from step S402.

On the other hand, when the counter M is 27 (step S410: Yes), that is, when no unused position information is left, the printer 30 transmits the undecryptable notice as the print result information to the print client 20 (step S334). Namely, the received print transmitting data D10 cannot be decrypted with any of the private keys generated with 27 pieces of position information, and hence the printer 30 judges that the print transmitting data D10 does not match the printer position information. Then, the printer 30 returns to the aforementioned process in step S310.

As described above, also according to the print system of this embodiment, the security of the print data D05 transmitted by the print client 20 or 22 can be enhanced and besides the security of the printer 30 or 32 itself can be enhanced.

Moreover, even if, in relation to the detection accuracy of the position detector 54, variations in printer .position information occurs, and thereby a discrepancy occurs between the printer position information used when the public key is generated in the public key transmission process and the printer position information used when the private key is generated in the print execution process, it is possible to absorb the discrepancy and generate the private key capable of decrypting the print transmitting data D10. Consequently, the print transmitting data D10 can be decrypted smoothly.

Figure 17:
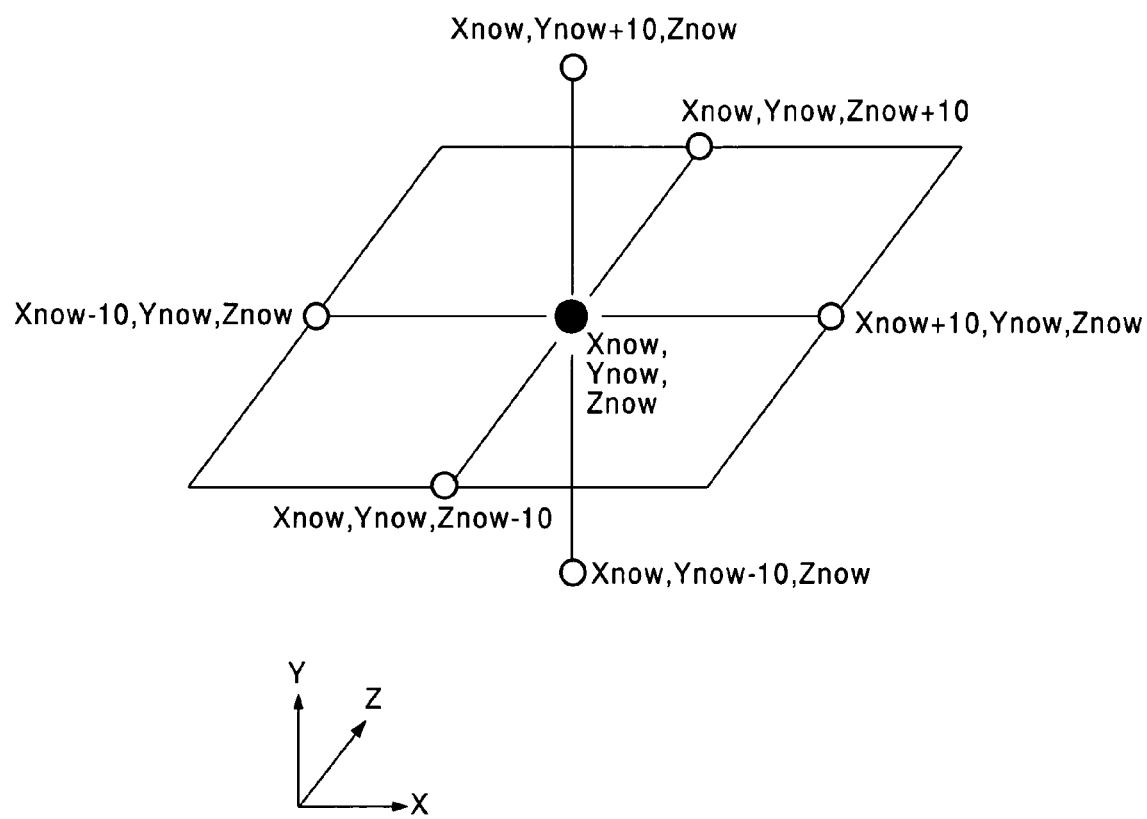
FIG. 17 is a diagram explaining a modification of the second and third embodiments of the present invention.

It should be mentioned that the present invention is not limited to the aforementioned embodiments, and various changes may be made therein. For example, in the aforementioned second and third embodiments, the printer position information Xnow, Ynow, Znow as the center and its surrounding 26 pieces of position information are selected as candidates for generating passphrases, but the manner of selection and number are not limited to the above. For example, as shown in FIG. 17, it is also possible to select the printer position information Xnow, Ynow, Znow as the center and its surrounding 6 pieces of position information as the candidates for generating passphrases.

Moreover, in the aforementioned second and third embodiments, position information contained within a range of ±10 m which corresponds to one minimum measurement unit of the position detector 54 is selected as the candidates for generating passphrases, but it is also possible to select position information contained within a range corresponding to N minimum measurement units (N is a natural number) with the printer position information Xnow, Ynow, Znow as the center as the candidates for generating passphrases.

Further, in the aforementioned embodiments, the range of position information for generating passphrases is set within the same distance in any of the X-axis direction, Y-axis direction, and Z-axis direction, but the distances in the X-axis direction, Y-axis direction, and Z-axis direction are not necessarily the same. Namely, the distances in the X-axis direction, Y-axis direction, and Z-axis direction may be set differently. Moreover, the distances in the positive and negative directions in each of the X-axis direction, Y-axis direction, and Z-axis direction may be different.

Furthermore, in the aforementioned embodiments, the printer 30 or 32 executes a print operation only when the received print transmitting data D10 can be decrypted with the private key, but regardless of whether the print transmitting data D10 can be decrypted, the print operation may be executed based on data acquired by decryption. In this case, when the print transmitting data cannot be decrypted properly with the private key, the printer 30 or 32 executes a meaningless print operation, and hence the user cannot obtain a meaningful print result.

In addition, the present invention is explained with the print client as an example of a data transmitting device which transmits data whose security is to be ensured and the printer as an example of a data receiving device which receives the data in the aforementioned embodiments, but a combination of the data transmitting device and the data receiving device in a data transmitting and receiving system is not limited to that in the aforementioned embodiments. For example, in the data transmitting and receiving system, the data transmitting device may be a digital camera for taking images and the data receiving device may be a data server which stores data on the images taken by the digital camera. In this case, transmitting data transmitted from the digital camera is received by the data server, the data server performs the processes in the aforementioned embodiments, and when this transmitting data matches device position information at this point in time in the data server, the data server stores data contained in the transmitting data, and when the transmitting data and the device position information at this point in time do not match, the data sever does not store the data contained in the transmitting data.

Moreover, in the data transmitting and receiving system, the data transmitting device may be a personal computer and the data receiving device may be a projector which projects image data transmitted from the personal computer. In this case, transmitting data transmitted from the personal computer is received by the projector, the projector performs the processes in the aforementioned embodiments, and when this transmitting data matches device position information at this point in time in the projector, the projector projects data contained in the transmitting data, and when the transmitting data and the device position information at this point in time do not match, the projector does not project the data contained in the transmitting data.

Further, in the data transmitting and receiving system, the data transmitting device may be a content server for music or the like and the data receiving device may be a playback device for content data such as music transmitted from the content server. In this case, transmitting data transmitted from the content server is received by the playback device, the playback device performs the processes in the aforementioned embodiments, and when this transmitting data matches device position information at this point in time in the playback device, the playback device plays back data contained in the transmitting data, and when the transmitting data and the device position information at this point in time do not match, the playback device does not play back the data contained in the transmitting data.

Furthermore, the aforementioned embodiments are explained with the case where a print medium for the printer 30 or 32 is a print sheet as an example, but the print medium is not limited to this, and the present invention can be applied to other print media such as an OHP sheet and the like.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the print client 20 or 22 and/or the printer 30 or 32 read the record medium on which this program is recorded and execute this program.

The print client 20 or 22 and/or the printer 30 or 32 sometimes has other programs such as an operating system, other application programs, and the like. In this case, by using these other programs in the print client 20 or 22 and/or the printer 30 or 32, a command, which calls a program to realize a process equal to that in the aforesaid embodiments out of programs in the print client 20 or 22 and/or the printer 30 or 32, may be recorded on the record medium.

Further, such a program can be distributed not in the form of the record medium but in the form of a carrier wave via a network. The program transmitted in the form of the carrier wave over the network is incorporated in the print client 20 or 22 and/or the printer 30 or 32, and the aforesaid embodiments can be realized by executing this program.

Furthermore, when being recorded on the record medium or transmitted as the carrier wave over the network, the program is sometimes encrypted or compressed. In this case, the print client 20 or 22 and/or the printer 30 or 32 which has read the program from the record medium or the carrier wave needs to execute the program after decrypting or expanding it.

What is claimed is:

1. A printer which processes print transmitting data, comprising:
a print transmitting data receiver which receives the print transmitting data;
a printer position information detector which detects printer position information to specify a place where the printer is installed;
a first printer position information acquisition which acquires printer position information from the printer position information detector at a point in time when the print transmitting data receiver receives the print transmitting data;
a compensation printer position information generator which generates compensation position information based on the printer position information in order to compensate for variations in the printer position information acquired by the first printer position information acquisition; and
a print executor which generates a private key with a passphrase containing at least the compensation printer position information, executes a print operation based on the print transmitting data when the print transmitting data is decrypted with the private key, and does not execute the print operation based on the print transmitting data when the print transmitting data is not decrypted with the private key,
wherein the compensation printer position information generator regards the printer position information acquired by the first printer position information acquisition and a plurality of pieces of position information surrounding the printer position information as candidates for the compensation printer position information, and
the print executor executes the print operation based on the print transmitting data when the print transmitting data is decrypted with any one of the candidates for the compensation printer position information, and the print executor does not execute the print operation based on the print transmitting data when the print transmitting data is not decrypted with any of the candidates for the compensation printer position information.

2. The printer according to claim 1, wherein the compensation position information generator regards position information within a range of N times the minimum measurement unit of the printer position information detector with the printer position information as a center, as the candidate for the compensation printer position information, where N is a natural number.

3. The printer according to claim 2, further comprising:
a public key acquisition request receiver which receives a public key acquisition request transmitted from a print client;
a position information for public key use acquisition which acquires printer position information from the printer position information detector when the public key acquisition request receiver has received the public key acquisition request;
a public key generator which generates a public key with a passphrase containing at least the printer position information acquired by the position information for public key use acquisition; and
a public key transmitter which transmits the public key generated by the public key generator to the print client which has transmitted the public key acquisition request.

4. The printer according to claim 3, further comprising:
an authentication information receiver which receives authentication information from the print client; and
an authentication information judgment section which judges whether the authentication information received by the authentication information receiver coincides with previously registered authentication information, wherein
the public key transmitter transmits the public key to the print client only when the authentication information judgment section judges that the two pieces of authentication information coincide.

5. The printer according to claim 4, further comprising:
a device-specific information acquisition which acquires device-specific information which is information specific to the printer, wherein
the passphrase contains at least the printer position information and the device-specific information.

6. A control method of a printer which process print transmitting data, comprising the steps of:
receiving the print transmitting data;
acquiring printer position information to specify a place where the printer is installed from a printer position information detector at a point in time when the print transmitting data is received and regarding the printer position information as first printer position information;

generating compensation printer position information based on the first printer position information in order to compensate for variations in the first printer position information;

generating a private key with a passphrase containing at least the compensation printer position information; and executing a print operation based on the print transmitting data when the print transmitting data is decrypted with the private key and not executing the print operation based on the print transmitting data when the print transmitting data is not decrypted with the private key, wherein the step of generating the compensation printer position information comprises the step of regarding the first printer position information and a plurality of pieces of position information surrounding the first printer position information as candidates for the compensation printer position information, and in the step of executing the print operation, the print operation based on the print transmitting data is executed when the print transmitting data is decrypted with any one of the candidates for the compensation printer position information, and the print operation based on the print transmitting data is not executed when the print transmitting data is not decrypted with any of the candidates for the compensation printer position information.

7. The control method of the printer according to claim 6, wherein the step of generating the compensation printer position information comprises the step of regarding position information within a range of N times the minimum measurement unit of the printer position information detector with the printer position information as a center, as the candidate for the compensation printer position information, where N is a natural number.

8. The control method of the printer according to claim 7, further comprising the steps of:

receiving a public key acquisition request transmitted from a print client;

acquiring printer position information from the printer position information detector when the public key acquisition request has been received and regarding the printer position information as second printer position information;

generating a public key with a passphrase containing at least the second printer position information; and transmitting the generated public key to the print client which has transmitted the public key acquisition request.

9. The control method of the printer according to claim 8, further comprising the steps of:

receiving authentication information from the print client; and judging whether the received authentication information coincides with previously registered authentication information, wherein in the step of transmitting the public key, the public key is transmitted to the print client only when the two pieces of authentication information coincide.

10. The control method of the printer according to claim 9, further comprising the step of acquiring device-specific information which is information specific to the printer, wherein the passphrase contains at least the printer position information and the device-specific information.

* * * * *